(12) United States Patent
Doane et al.

(10) Patent No.: US 7,236,151 B2
(45) Date of Patent: Jun. 26, 2007

(54) LIQUID CRYSTAL DISPLAY

(75) Inventors: J. William Doane, Kent, OH (US); Asad A. Khan, Kent, OH (US); Irina Shiyanovskaya, Stow, OH (US); Albert Green, Springfield, VA (US)

(73) Assignee: Kent Displays Incorporated, Kent, OH (US)

( * ) Notice: Subject to any disclaimer, the term of this patent is extended or adjusted under 35 U.S.C. 154(b) by 0 days.

(21) Appl. No.: 11/006,100

(22) Filed: Dec. 7, 2004

(65) Prior Publication Data

US 2005/0162606 A1    Jul. 28, 2005

Related U.S. Application Data

(60) Provisional application No. 60/565,586, filed on Apr. 27, 2004, provisional application No. 60/539,873, filed on Jan. 28, 2004.

(51) Int. Cl.
    G09G 3/36    (2006.01)
(52) U.S. Cl. .......................... 345/87; 345/107
(58) Field of Classification Search .......... 345/87–100, 345/105, 107, 204; 349/113, 114, 115, 125, 349/127, 132, 137, 147; 348/790, 791, 792, 348/793, 794
    See application file for complete search history.

(56) References Cited

U.S. PATENT DOCUMENTS

| 3,600,060 | A | 8/1971 | Churchill |
| 3,680,950 | A | 8/1972 | Haas et al. |
| 4,362,903 | A | 12/1982 | Eichelberger et al. |
| 4,510,188 | A | 4/1985 | Ruggeri |
| 4,642,250 | A | 2/1987 | Spector |
| 4,684,771 | A | 8/1987 | Wuthrich |
| 4,688,900 | A | 8/1987 | Doane et al. |
| 4,747,413 | A | 5/1988 | Bloch |
| 4,890,902 | A | 1/1990 | Doane et al. |
| 4,896,946 | A | 1/1990 | Suzuki et al. |
| 4,948,232 | A | 8/1990 | Lange |
| 5,007,872 | A | 4/1991 | Tang |
| 5,061,553 | A | 10/1991 | Olsen, Jr. |
| 5,161,479 | A | 11/1992 | Mahr |
| 5,172,108 | A | 12/1992 | Wakabayashi et al. |
| 5,200,845 | A | 4/1993 | Crooker et al. |
| 5,360,503 | A | 11/1994 | Coffy |

(Continued)

FOREIGN PATENT DOCUMENTS

WO    2005/072447    8/2005

(Continued)

OTHER PUBLICATIONS

*Reflective display with photoconductive layer and abistable reflective cholesteric mixture*, Hidefumi Yoshida et al., Journal SID 5/3, 1997, pp. 269-274.

(Continued)

*Primary Examiner*—Nitin Patel
(74) *Attorney, Agent, or Firm*—Pearne & Gordon LLP

(57) ABSTRACT

A flexible liquid crystal display is provided wherein an addressable liquid crystal layer is disposed on a single flexible substrate so that the display itself will exhibit flexibility. The substrate is preferably a flexible non-transparent material and more preferably a drapable material such as fabric.

81 Claims, 10 Drawing Sheets

U.S. PATENT DOCUMENTS

| | | | |
|---|---|---|---|
| 5,376,699 A | 12/1994 | Sage | |
| 5,437,811 A | 8/1995 | Doane et al. | |
| 5,453,863 A | 9/1995 | West et al. | |
| 5,493,430 A | 2/1996 | Lee et al. | |
| 5,530,457 A | 6/1996 | Helgeson | |
| 5,625,477 A | 4/1997 | Wu et al. | |
| 5,636,044 A | 6/1997 | Yuan et al. | |
| 5,644,330 A | 7/1997 | Catchpole et al. | |
| 5,668,614 A | 9/1997 | Chien et al. | |
| 5,691,795 A | 11/1997 | Doane et al. | |
| 5,734,155 A | 3/1998 | Rostoker | |
| 5,748,277 A | 5/1998 | Huang et al. | |
| 5,751,257 A | 5/1998 | Sutherland | |
| 5,815,136 A | 9/1998 | Ikeda et al. | |
| 5,847,798 A | 12/1998 | Yang et al. | |
| 5,889,572 A | 3/1999 | Takahashi et al. | |
| 5,981,408 A | 11/1999 | Nakagawa et al. | |
| 5,996,897 A | 12/1999 | Prancz | |
| 6,034,752 A | 3/2000 | Khan et al. | |
| 6,061,107 A | 5/2000 | Yang et al. | |
| 6,072,619 A | 6/2000 | Kiryuschev et al. | |
| 6,096,666 A | 8/2000 | Jachimowicz et al. | |
| 6,133,895 A | 10/2000 | Huang | |
| 6,154,190 A | 11/2000 | Yang et al. | |
| 6,224,964 B1* | 5/2001 | Kawai et al. | 428/32.81 |
| 6,253,190 B1 | 6/2001 | Sutherland | |
| 6,268,839 B1 | 7/2001 | Yang et al. | |
| 6,268,841 B1 | 7/2001 | Cairns et al. | |
| 6,269,342 B1 | 7/2001 | Brick et al. | |
| 6,270,783 B1 | 8/2001 | Slavtcheff et al. | |
| 6,271,898 B1 | 8/2001 | Clikeman et al. | |
| 6,277,439 B1 | 8/2001 | Painter | |
| 6,278,429 B1 | 8/2001 | Ruth et al. | |
| 6,307,605 B1 | 10/2001 | Bailey | |
| 6,316,278 B1 | 11/2001 | Jacobsen et al. | |
| 6,320,563 B1 | 11/2001 | Yang et al. | |
| 6,359,673 B1 | 3/2002 | Stephenson | |
| 6,377,321 B1 | 4/2002 | Khan et al. | |
| 6,423,368 B1 | 7/2002 | Stephenson et al. | |
| 6,433,849 B1 | 8/2002 | Lowe | |
| 6,452,590 B1 | 9/2002 | Awamoto et al. | |
| 6,459,467 B1 | 10/2002 | Hashimoto et al. | |
| 6,468,638 B2 | 10/2002 | Jacobsen et al. | |
| 6,483,563 B2 | 11/2002 | Khan et al. | |
| 6,532,052 B1 | 3/2003 | Khan et al. | |
| 6,556,262 B1 | 4/2003 | Stephenson et al. | |
| 6,585,849 B2 | 7/2003 | Smith et al. | |
| 6,603,259 B1 | 8/2003 | Kiryuschev et al. | |
| 6,608,438 B2 | 8/2003 | Topelberg et al. | |
| 6,618,114 B1 | 9/2003 | Freeman | |
| 6,624,565 B2 | 9/2003 | Topelberg | |
| 6,628,256 B2 | 9/2003 | Nishimura | |
| 6,654,080 B1 | 11/2003 | Khan et al. | |
| 6,655,788 B1* | 12/2003 | Freeman | 347/58 |
| 6,657,620 B2 | 12/2003 | Oishi et al. | |
| 6,697,191 B2 | 2/2004 | Kiryuschev et al. | |
| 6,710,760 B1 | 3/2004 | Johnson et al. | |
| 6,727,197 B1 | 4/2004 | Wilson et al. | |
| 6,788,362 B2 | 9/2004 | Stephenson et al. | |
| 6,819,310 B2 | 11/2004 | Huang et al. | |
| 6,850,217 B2 | 2/2005 | Huang et al. | |
| 6,864,435 B2 | 3/2005 | Hermanns et al. | |
| 6,902,454 B1* | 6/2005 | Petruchik | 445/24 |
| 7,009,666 B2 | 3/2006 | Khan et al. | |
| 2001/0015712 A1 | 8/2001 | Hashimoto | |
| 2002/0030776 A1 | 3/2002 | Khan et al. | |
| 2002/0030786 A1 | 3/2002 | Stephenson | |
| 2002/0186182 A1 | 12/2002 | Stephenson et al. | |
| 2003/0011549 A1 | 1/2003 | Murahashi et al. | |
| 2003/0016329 A1 | 1/2003 | Smith et al. | |
| 2003/0019575 A1 | 1/2003 | Smith et al. | |
| 2003/0031845 A1* | 2/2003 | Umeya et al. | 428/212 |
| 2003/0034945 A1 | 2/2003 | Mi et al. | |
| 2003/0063245 A1 | 4/2003 | Bowley et al. | |
| 2003/0071791 A1 | 4/2003 | Hanson et al. | |
| 2003/0085380 A1 | 5/2003 | Schuhmacher et al. | |
| 2003/0117548 A1 | 6/2003 | Stephenson | |
| 2003/0155151 A1 | 8/2003 | Hermanns et al. | |
| 2003/0160912 A1 | 8/2003 | Stephenson | |
| 2003/0169221 A1 | 9/2003 | Stephenson et al. | |
| 2003/0184569 A1 | 10/2003 | Koga et al. | |
| 2003/0202136 A1 | 10/2003 | Stephenson et al. | |
| 2003/0206147 A1 | 11/2003 | Mi et al. | |
| 2003/0222139 A1 | 12/2003 | Stephenson et al. | |
| 2004/0032545 A1 | 2/2004 | Stephenson et al. | |
| 2004/0080477 A1 | 4/2004 | Capurso et al. | |
| 2005/0001797 A1 | 1/2005 | Miller, IV et al. | |
| 2005/0007336 A1 | 1/2005 | Albert et al. | |
| 2005/0083284 A1 | 4/2005 | Huang et al. | |
| 2005/0195354 A1 | 9/2005 | Doane et al. | |

FOREIGN PATENT DOCUMENTS

| | | |
|---|---|---|
| WO | 2005/072455 | 8/2005 |
| WO | 2005/081779 | 9/2005 |

OTHER PUBLICATIONS

*Photostable Tilted-Perpendicular Alignment of Liquid Crystals for Light Valves*, Anna Lackner et al., Proceedings of the SID, vol. 31/4, 1990, pp. 321-326.

*Transparent Phase Images in Photoactivated Liquid Crystals*, J.S. Margerum et al., Applied Physics Letter, vol. 19, No. 7, Oct. 1, 1971, pp. 216-218.

*Development of a Flexible Electronic Display Using Photographic Technology*, Stanley Stephenson et al., SID 04 Digest, pp. 774-777.

*A Fully Flexible Colour Display.* Peter Slikkerveer et al., SID 04 Digest, pp. 770-773.

*Robust Flexible LCD's with Paintable Technology*, Joost P.A. Vogels et al., SID 04 Digest, pp. 767-769.

*Invited Paper: What is Electronic Paper? The Expectations*, Makoto Omodani, SID 04 Digest, pp. 128-131.

*Effect of Woven Fabric Anisotropy on Drape Behaviour*, Sidabraite, et al., ISSN 1392-1320, Materials Science, vol. 9, No. 1. 2003, pp. 111-115.

*The Characterisation of the Static and Dynamic Drape of Fabrics*, G.K. Stylios et al., J. Text. Inst., 1997, 88 Part 1, No. 4, pp. 465-475.

*Modelling the Fused Panel for a Numerical Stimulation of Drape*, Jevsnik et al., Fibers & Textiles in Eastern Europe, Jan./Mar. 2004, vol. 12, No. 1, 0047-52.

*Mechanics of Elastic Performance of Textile Materials*, Chauncey Chu et al., Textile Research Journal, Aug. 1950, pp. 539-548.

*The Dependence of Fabric Drape on Bending and Shear Stiffness*, G.E. Cusick, J. Textile Institute. 36, 11, 1965, pp. T597-T-607.

*Liquid Crystal Dispersions*, Paul S. Drzaic., World Scientific, Series on Liquid Crystals, vol. 1., pp. xi-xv, 1995.

*Plastic VGA Reflective Cholesteric LCDs with Dynamic Drive*, G.M. Podojil et al., SID proceedings, 1998, pp. 51-54.

*Reflective Color Display Using Cholesteric Liquid Crystals*, K. Hashimoto et al., SIC 98 Digest, pp. 897-900.

*Robust Flexible LCDs with Paintable Technology*, J.P.A. Vogels et al., Society for Information Display, 2004 Proceedings. pp. 767-769.

*Black and White Photo-addressable Electronic Paper using Encapsulated Cholester Liquid Crystal and Organic Photoconductor*, T. Kakinuma et al., IDW 2002, pp. 1345-1348.

*Characterization of "Peas in a Pod", a Novel Idea for Electronic Paper*, S. Maeda et al., IDW 2002, pp. 1353-1356.

*Holographic Polymer-Dispersed Liquid Crystals (H-PDLCs)*, T.J. Bunning et al., Annu. Rev. Mater. Sci 2000, 30:83-115, pp. 83-115.

*Reflective display with photoconductive layer and bistable reflective cholesteric mixture*, H. Yoshida, Journal of SID 5/3 1997, pp. 269-274.

*Reflective Multicolor Display Using Cholesteric Liquid Crystals*, M. Okada et al., Proc, SID 97 Digest, pp. 1019-1022.

*Multiple Color High Resolution Reflective Cholesteric Liquid Crystal Display*, D. Davis et al., Proc IDRC (242) 1997.

*Full Color (4096 Colors) Reflective Cholesteric Liquid Crystal Display*, X. Huang et al., Proceedings of Asia Display 98, pp. 883-886 (1998).

Doane, J.W., Liquid Crystals: Applications and Uses, Ed. B. Bahadur, World Scientific Publishers, Ch. 14 (1990).

Jing-Jou Tang et al.,*A 30-V Row/Column Driver for PSCT LCD Using High-Voltage BiMOS Process*, Online Article, dated 1999. http://www/us.semiconductors.philips.com/pip/PCF8578.html.

LCD/row/column driver for dot matrix graphic displays, printed Jul. 8, 2003, pp. 1-3.

40CH Segment/Driver for Dot Matrix LCD, KS0065B, Samsung Electronics, 12 pages.

Doane, J. William, Khan, Asad; *Cholesteric Liquid Crystal for Flexible Displays*, in *Flexible Flat Panel Displays*, Ed. G. Crawford) John Wiley & Sons, England, Chapter 17 (2005) pp. 331-354.

Doane, J. William, "Polymer Dispersed Liquid Crystal Displays", in *Liquid Crystals: Applications & Uses*, Ed. Birendra Bahadur (World Scientific Pub. 1990), Chapter 14, pp. 361-395.

Luo, F.C., "*Active Matrix LC Displays*", in *Liquid Crystals: Applications & Uses*, (ed. B. Bahadur), World Scientific, Singapore, Chapter 15, pp. 397-436.

\* cited by examiner

LIQUID CRYSTAL DISPLAY

RELATED APPLICATIONS

This regular application claims the benefit of co-pending provisional applications 60/565,586, filed 04/27/2004 and 60/539,873, filed Jan. 28, 2004.

This application was made in part with United States Government support under cooperative agreement No. DAAB07-03-C-J406 awarded by the Department of Defense. The government may have certain rights in this invention.

BACKGROUND OF THE INVENTION

A revolution in the information display technology began in the early 1970s with the invention of the liquid crystal display (LCD). Because the LCD is a flat-panel display of light weight and low power which provides a visual read out that conforms to the small size, weight and battery demands of a handheld electronic device, this display technology enabled a new broad class of handheld and other portable products. Commercially, the LCD first appeared in volume as a digital readout on wrist watches, then on instruments and, later, enabled the laptop computer, personal data assistant and many other digital devices. Today LCD technology is even replacing cathode ray tubes in televisions and PCs.

Nearly every commercial LCD display manufactured and sold today is on glass substrates. Glass offers many features suitable for the manufacture of LCDs. It can be processed at high temperatures, it is rigid and suitably rugged for batch processing methods used in high volume manufacturing, its surface can be made very smooth and uniform over large areas and it has desirable optical properties such as high transparency. There are many applications, however, where glass is far from being the ideal substrate material. Glass substrates cannot be made very flexible and are not very rugged, being unsuitable for web manufacturing and subject to easy breakage. As a result there is a large worldwide effort to develop displays on more flexible and rugged substrates that can not only conform to three-dimensional configurations but which can also be repeatedly flexed. A display is desired that has the flexibility of a thin plastic sheet, paper or fabric, so that it can be draped, rolled up or folded like paper or cloth. This would not only make the display more portable and easier to carry, it would expand its potential applications well beyond those of the typical flat panel information displays known today: A display worn on the sleeve; the back of a bicyclists coat that shows changing direction signals; textile that changes its color or design are but a few examples.

While the ability of an electrically addressable liquid crystal display to be flexible and deform like cloth or paper would be advantageous for any LCD technology, it is especially advantageous in applications suited to cholesteric liquid crystal displays. Cholesteric displays can be made highly reflective such that they can be seen in bright daylight or a dimly lit room without the aid of a heavy and power consuming backlight. Since cholesteric liquid crystals can be made to be bistable they require power only when being addressed, further adding to the power savings associated with such displays. Cholesteric liquid crystalline materials are unique in their optical and electro-optical features. Of principal significance, they can be tailored to Bragg reflect light at a pre-selected wavelength and bandwidth. This feature comes about because these materials posses a helical structure in which the liquid crystal (LC) director twists around a helical axis. The distance over which the director rotates 360° is referred to as the pitch and is denoted by P. The reflection band of a cholesteric liquid crystal is centered at the wavelength, $\lambda_O = 0.5(n_e + n_o)P$ and has the bandwidth, $\Delta\lambda = (n_e - n_o)P$ which is usually about 100 nm where $n_e$ and $n_o$ are the extra-ordinary and ordinary refractive indices of the LC, respectively. The reflected light is circularly polarized with the same handedness as the helical structure of the LC. If the incident light is not polarized, it will be decomposed into two circularly polarized components with opposite handedness and one of the components reflected. The cholesteric material can be electrically switched to either one of two stable textures, planar or focal conic, or to a homeotropically aligned state if a suitably high electric field is maintained. In the planar texture the helical axis is oriented perpendicular to the substrate to Bragg reflect light in a selected wavelength band whereas in the focal conic texture it is oriented, on the average, parallel to the substrate so that the material is transparent to all wavelengths except for weak light scattering, negligible on an adjacent dark background. These bistable structures can be electronically switched between each other at rapid rates on the order of milliseconds. Gray scale is also available in that only a portion of a pixel can be switched to the reflective state thereby controlling the reflective intensity.

The bistable cholesteric reflective display technology was introduced in the early 1990's as a low power, sunlight readable technology intended primarily for use on handheld devices. Such portable devices demand long battery lifetimes requiring the display to consume very little power. Cholesteric displays are ideal for this application as the bistability feature avoids the need for refreshing power and high reflectivity avoids the need for power-consuming backlights. These combined features can extend battery life times from hours to months over displays that do not have these features. Reflective displays are also easily read in very bright sunlight where backlit displays are ineffective. Because of the high reflective brightness of a cholesteric display and its exceptional contrast, a cholesteric display can be easily read in a dimly lit room. The wide view angle offered by a cholesteric display allows several persons to see the display image at the same time from different positions. In the case of cholesteric materials possessing positive dielectric anisotropy, modes of operation other than a bistable mode are possible by applying a field to untwist the cholesteric material into a transparent, homeotropic texture. Quick removal of the field transforms the material into the reflective planar texture. The more fundamental aspects of such modern cholesteric displays are disclosed in, for example, U.S. Pat. Nos. 5,437,811 and 5,453,863, incorporated herein by reference.

Bistable cholesteric liquid crystal displays have several important electronic drive features that other bistable reflective technologies do not. Of extreme importance for addressing a matrix display of many pixels is the characteristic of a voltage threshold. A threshold voltage is essential for multiplexing a row/column matrix without the need of an expensive active matrix (transistor at each pixel). Bistability with a voltage threshold allows very high-resolution displays to be produced with low-cost passive matrix technology.

In addition to bistable cholesteric displays with liquid crystalline materials having a positive dielectric anisotropy, it is possible to fabricate a cholesteric display with liquid crystalline materials having a negative dielectric anisotropy as, for example, described in the U.S. Pat. No. 3,680,950 to Haas et al., or 5,200,845 to Crooker et al., incorporated herein by reference. These "negative materials" like the "positive" materials are chiral nematic liquid crystals that are prepared from nematic materials that have been twisted into a helical molecular arrangement by the addition of chiral compound or collection of chiral compounds. The negative and positive materials are prepared from nematic liquid crystals with either a negative or positive dielectric anisotropy respectively.

Negative type cholesteric displays can operate in a bistable mode where the material is switched into the stable planar (e.g., color reflective) texture with an AC pulse or into the stable focal conic (e.g., transparent) texture with a DC pulse as described by U.S. Pat. No. 3,680,950. There are other modes of operation such as has been disclosed by Crooker where a droplet dispersion of negative cholesteric materials is switched into the planar, color reflective texture with an applied electric field, but relaxes back into a transparent texture when the field is removed.

Some cholesteric materials possess a dielectric anisotropy that can be negative under an applied electric field of one frequency but positive at another frequency. This feature can be used to drive a bistable display using a dual frequency drive scheme as described in U.S. Pat. No. 6,320,563, incorporated herein by reference.

Another important feature of cholesteric materials is that the layers reflecting red, green, and blue (RGB) colors as well as IR night vision can be stacked (layered) on top of each other without optically interfering with each other. This makes maximum use of the display surface for reflection and hence brightness. This feature is not held by traditional displays were the display is broken into pixels of different colors and only one third of the incident light is reflected. Using all available light is important for observing a reflective display in a dimly lit room without a backlight. Gray scale capability allows stacked RGB, high-resolution displays with full-color capability where as many as 4096 colors have been demonstrated. Because a cholesteric display cell does not require polarizers, low cost birefringent plastic substrates such a PET can be used. Other features, such as wide viewing-angles and wide operating temperature ranges as well as fast response times make the cholesteric bistable reflective technology, the technology of choice for many low power applications.

Cholesteric liquid crystals are particularly well suited for flexible substrates. Such cholesteric displays have been reported by Minolta Co. Ltd. and by Kent Displays, Inc. involving two plastic substrates filled with cholesteric liquid crystal materials (Society for Information Display Proceedings, 1998, pp 897–900 and 51–54, respectively). While the substrates themselves are flexible, the assembled displays are much less flexible because of the lamination of two substrates together. Minolta has developed procedures for manufacturing flexible displays with two substrates as seen in U.S. Pat. No. 6,459,467.

Greater flexibility can be achieved if only one substrate is used and the display materials are coated or printed on the substrate. Cholesteric liquid crystals are made suitable for standard coating and printing techniques by forming them into polymer droplet dispersions. As droplet dispersions, the materials are made insensitive to pressure and shear such that an image on a bistable cholesteric display is not readily erased by flexing the substrate. Recently, Stephenson et al., at Kodak fabricated flexible bistable reflective displays with polymer dispersions of cholesteric liquid crystals on a single transparent plastic substrate using photographic methods (U.S. Published Application No. 2003/0202136 A1 and U.S. Pat. No. 6,788,362 B2). This process involves a sequence of depositions on transparent polyester plastic whereby the end product is a display where the images are viewed through the substrate. Such a process requires substrate materials that are transparent such as a clear plastic sheet.

In view of the foregoing, it is desirable to provide a reflective display that does not require a transparent substrate, making available a broader range of substrate materials such as fabrics made of fibers that can be deformed such as by bending, rolling, draping or folding. These added features offer many advantages and open up many new display applications. Use of flexible and drapable substrates can bring to the market place new displays that have the physical deformability of fabric so that they can be an integral part of clothing and have the feel and appearance of cloth because they can be draped and folded.

SUMMARY OF THE INVENTION

In view of the foregoing, it is therefore an object of the invention to provide an electrically addressable liquid crystal display having the physical deformability or drapability of textile or cloth which may incorporate, inter alia, any of the aforementioned liquid crystal materials and technologies. This invention also brings advantages in manufacturing where the display including the electrodes is made of organic materials that are coated or printed on the substrate. Conducting polymers are used instead of the traditional inorganic materials such as indium tin oxide (ITO) for the electrodes. On some fabrics, preparation layers are used to color, smooth or planarize the surface, adjust the resistivity, index match and other features. Polymer dispersions of cholesteric liquid crystals can be made from a wide variety of different methods as is suitable for various manufacturing processes or display function.

In one aspect of the invention there is provided a drapable electrically addressable liquid crystal display comprising a drapable substrate material, a layer of. liquid crystal material, a first conducting electrode disposed on a first side of said liquid crystal layer proximal said substrate, and a second conducting electrode disposed on a second side of said liquid crystal layer distal of said substrate, said electrodes adapted to be connected to electronic drive circuitry.

In another aspect of the invention, a flexible reflective liquid crystal display is provided which comprises a non-transparent flexible substrate material, a layer of liquid crystal material, a first conducting electrode disposed on a first side of said liquid crystal layer proximal said substrate, and a second conducting electrode disposed on a second side of said liquid crystal layer distal of said substrate, said electrodes adapted to be connected to electronic drive circuitry.

In a preferred aspect of the invention there is provided an electrically addressable liquid crystal display comprising, as a substrate, paper or a textile fabricated from natural or synthetic fibers, a layer of liquid crystal material, a first conducting electrode disposed on a first side of said liquid layer proximal said substrate, and a second conducting electrode disposed on a second side of said liquid crystal layer distal of said substrate, said electrodes adapted to be connected to electronic drive circuitry. Where drapable substrates are employed, the substrates will preferably have a drape coefficient less than about 98%. Drape coefficients of less than about 95% or further less than about 90% will be desirable depending upon the application.

In preferred embodiments of each the foregoing aspects of the invention one side of said substrate is smoother than the opposite side of said substrate. In one embodiment, one side of said substrate is made smoother by deposition of a layer of material thereon, preferably by interposing a planarization layer between the substrate and the first electrode.

Further preferred embodiments of each of the foregoing aspects of the invention will include an insulation layer disposed between at least one of the electrodes and the liquid crystal layer and, more preferably still, a protective coating disposed as un uppermost layer of at least a portion of the display.

The electrodes for use in connection with the foregoing aspects of the invention are preferably formed of a conducting polymer or carbon nanotube material. The second electrode is substantially optically transmissive. In some embodiments the first electrode will be comprised at least in part of the substrate. Similarly, the liquid crystal layer for use in connection with the foregoing aspects of the invention preferably comprises cholesteric liquid crystal material and, more preferably, a dispersion of droplets of the liquid crystal material. Preferred dispersions are selected from an emulsion, a phase separated liquid crystal material, or a microencapsulated liquid crystal material. Still more preferably, the dispersion is a polyurethane latex emulsion which comprises a mix of liquid crystal and latex in a ratio of from about 2:1 to about 6:1. Preferred cholesteric liquid crystal materials will have a positive dielectric anisotropy and a pitch length effective to reflect light in the visible or infrared spectrum.

In aspects of the invention employing an electrode matrix, the displays will preferably include a plurality of conducting electrodes arranged in substantially parallel lines on a first side of said liquid crystal layer proximal said substrate, and a plurality of conducting electrodes arranged in substantially parallel lines on an opposite side of said liquid crystal layer, said lines of electrodes on opposite sides of said liquid crystal layer being oriented substantially perpendicular to each other.

For some preferred applications, the displays will further including at least one additional liquid crystal layer disposed adjacent said layer of liquid crystal material. Preferably, these embodiments will include at least one additional liquid crystal layer disposed adjacent said layer of liquid crystal material, and conducting electrodes disposed on opposite sides thereof, whereby the additional layer is independently electrically addressable. In other aspects of the invention, the display can further include a layer of photoconductive material interposed between the liquid crystal layer and the first electrode or the first electrode can comprise an active matrix backplane.

A greater understanding of these and other aspects of the invention will be had from the following detailed description and accompanying drawings.

DESCRIPTION OF THE INVENTION

Figure 1:
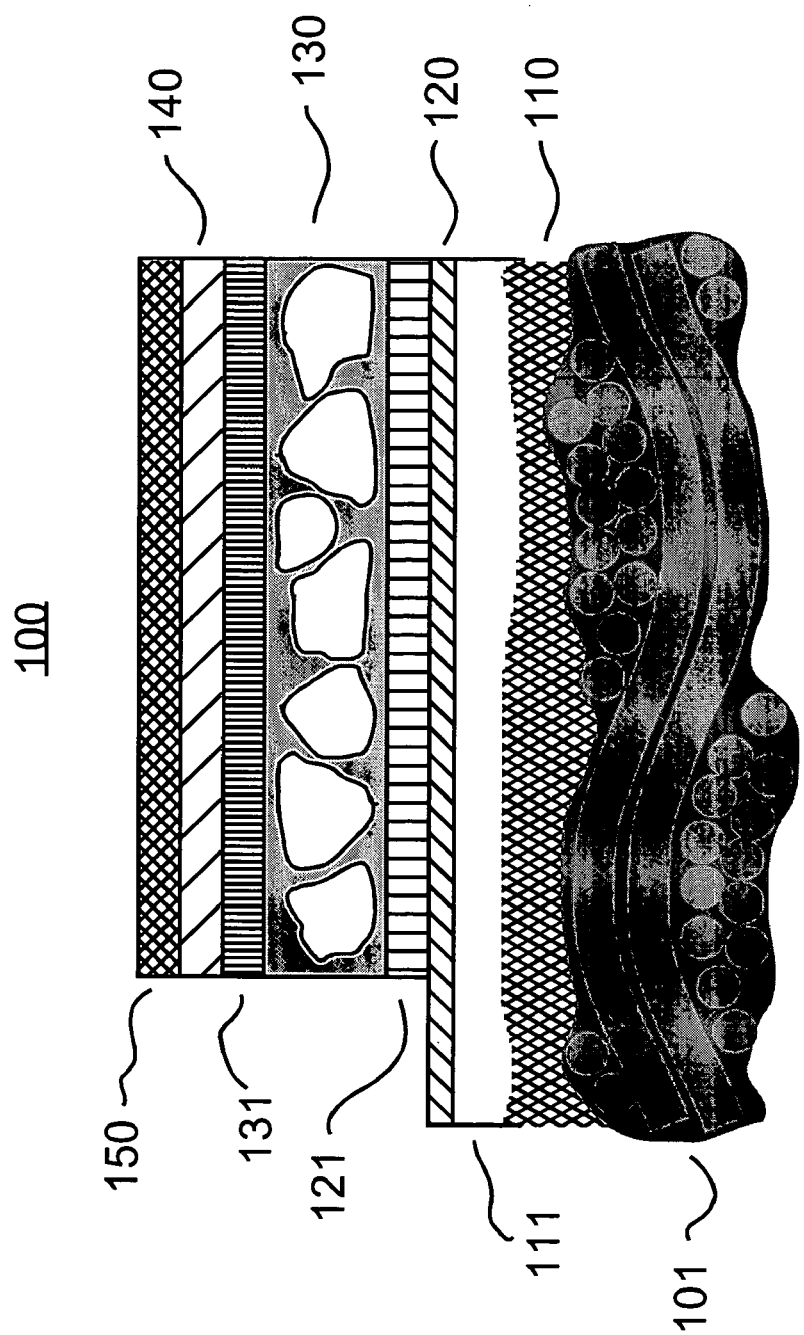
FIG. 1 is a diagrammatic cross-sectional illustration of a display configuration according to the invention wherein the display elements are coated, printed or laminated sequentially as layers on a fabric substrate.

This invention involves a substantial advance in addressable liquid crystal displays wherein, by forming the displays on or integrally with a drapable substrate, the display itself is drapable. Such substrates include textiles or fabrics made of natural or man-made fibers such as cloth or paper, as well as non-fiberous materials such as flexible or even drapable thin polymeric sheets or films. Advantageously, the substrate need not be transparent. With deformable substrates, cholesteric or other liquid crystal displays are made flexible, rugged and can even be sewn into or onto clothing to provide a wearable display. In fact, the display itself can form the material used to make the clothing or other fabric construct. A display with the drapability of cloth provides a new dimension to display technology enabling display applications that were not previously possible. Such displays can conform to three dimensional structures or flex and fold with a garment or other fabric construct containing the display. To this end, the displays according to the invention are operatively deformable, meaning that they will function even though they are or have been deformed. In preferred applications, the displays according to the invention will be operatively drapable such that they can have folds and possess a measurable drape coefficient.

The formability of a fabric or other drapable substrate material can be defined as its ability to re-form from a two-dimensional shape to a simple or complex three-dimensional shape. The drape coefficient is used to describe the degree of 3-D deformation when the fabric specimen is draped over a drapemeter as described, for example, in the publication: "Effect of Woven Fabric Anisotropy on Drape Behavior," ISSN 1392-1320, *Materials Science* (Medziagotyra), Vol. 9, No. 1, pp. 111–115 (2003) by V. Sidabraitre and V. Masteikaite, or "Modeling the Fused Panel for a Numerical Simulation of Drape" *Fibers and Textiles*, Vol. 12, pages 47–52 (2004), by S. Jevsnik and J. Gersak, incorporated herein by reference. Drapability is a phenomenon that occurs when a material such as a curtain, flag, table cloth or flared skirt hangs from an object. The drape coefficient, DC, describes any deformation between draped and undraped material. In terms of percentage, it is described by the ratio: $DC=100(S_P-\pi R_1^2)/(\pi R_2^2-\pi R_1^2)$ were $R_2$ is the radius of a circular cut of non-deformed fabric; $R_1$, the radius of a horizontal disc holding the fabric, and $S_P$ the projected area of the draped specimen, including the part covered by the horizontal disc. The value of DC varies between zero and 100%. Since the value of DC can depend on the values selected for $R_1$ and $R_2$ of the drapemeter, we follow others in taking $R_1=9$ cm and $R_2=15$ cm. The larger the value of the drape coefficient, the stiffer the fabric and more difficult to reform. Alternatively, the lower the value of DC, the easier to reform and adapt to shapes. Some examples of desirable fabric substrate materials include silk, cotton, nylon, rayon, polyester, Kevlar, or similar materials made of fibrous material formed by woven and non-woven means having the deformability of cloth. Some examples of fabrics having the desired drapability are shown in Table I, which shows measured values of the drape coefficient, DC, for various fabric materials made with $R_2=15$ cm and $R_1=9$ cm. The data on the materials identified with an aserisk (*) were obtained from the publication "The Dependence of Fabric Drape on Bending and Shear Stiffness, *J. Textile Institute*, Vol. 56, pp. 596–606 (1965) by G. E. Cusick, incorporated herein by reference. The other materials were obtained from Jo-Ann Fabrics, Cuyahoga Falls, Ohio and Hudson, Ohio, and the DC values measured.

TABLE I

| Fabric | Weight (g/m$^2$) | Thickness (mm) | DC(%) |
|---|---|---|---|
| *Woven dress fabric, spun viscose rayon | 231 | 0.36 | 67.8 |
| *Woven dress fabrics, spun viscose rayon | 142 | 0.41 | 36.9 |
| *Plain woven 1.5 den spun viscose rayon | 196 | 0.45 | 32.6 |
| *Plain woven continuous-filament acetate and rayon | 226 | 0.46 | 24.7 |
| * Woven dress fabric cotton | 115 | 0.20 | 75.5 |
| * Woven dress fabric cotton | 105 | 0.31 | 97.2 |
| * Plain woven, continuous-filament polyester fiber | 96 | 0.20 | 49.9 |
| Polyester from Jo-Ann Fabrics | 186 | 0.3 | 14 |
| Polyester-65%, nylon 35% from Jo-Ann Fabrics | 116 | 0.17 | 49 |
| Polyester, satin from Jo-Ann Fabrics | 128 | 0.21 | 52 |

As will be apparent to those of ordinary skill in the art in view of the present disclosure, any deformable material having the desired flexibility or drapability and capable of supporting the display elements as disclosed herein will be suitable for use in the invention. In some preferred embodiments, the fabric substrate may be a composite or, more preferably, a fiber reinforced composite such as cotton and polyisoprene. An example of such composites is a raincoat where the cotton provides the feel and drapability of cloth and polyisoprene provides water resistance. Another example is rayon and neoprene used as a light shield against laser light such as that obtained by Thorlabs, Inc. (NJ) catalog # BK5. Composites can be useful substrate materials for many of the preferred displays of the invention in that they may require less planarization for the display elements.

In many preferred embodiments, the substrate material is non transparent. While black is a preferred color, other colors such as dark blue, green or some other color may be used to additively mix with the reflective color of the cholesteric liquid crystal to provide the desired color of text or other image addressed on the display. The substrate material itself may be substantially clear or transparent but the substrate made non-transparent by adding a black coating or dye to render it opaque, translucent or non-transparent as required for the background of the display. The image on a reflective cholesteric display is viewed against the background. It is therefore important that the background absorb unwanted light and not provide light that competes with or washes out light reflected from the cholesteric liquid crystal. Most fabrics are non-transparent. There are many examples of deformable sheet materials that are not made of fibers such as polymer films. If the sheet is thin enough, these films may also be drapable. An example of a polymer film that is non-transparent and very drapable is black static cling polyvinyl chloride sheet material from Graphix Plastics, Cleveland Ohio. Other examples of non-fiberous and drapable plastic sheets having the desired drapability are shown in Table II, which shows measured values of the drape coefficient, DC, for various non-fiberous sheet materials ($R_1=9$ cm and $R_2=5$ cm). The value of the drape coefficient was measured by photographing from above, the drape of the specimen of radius $R_2$ draped over a pedestal of radius $R_1$ under a weighed disk of the same radius. The areas of the projected image of the drape in the circle of radius $R_2$ were obtained from the digital photograph. In all cases, the drape showed the characteristic folds.

TABLE II

| Sheet Material | Weight (g/m$^2$) | Thickness (mm) | DC(%) |
|---|---|---|---|
| Black polyvinyl chloride from Graphix Plastics | 189 | 0.15 | 52 |
| Clear DuraLar (general purpose polyester) | 18.1 | 0.013 | 68 |
| Clear DuraLar (general purposed polyester) | 32.9 | 0.025 | 95 |
| Clear DuraLar (general purpose polyester) | 73.7 | 0.050 | 98 |

Sheet materials which are too thick do not exhibit drape but may bend or be flexed about one axis such as, for example, being rolled up. An example is 5 mil (0.125 mm thick) Clear DuraLar (polyester) or 5 mil thick Teijin Limited polycarbonate ITO coated foil (SS120-B30). Such 2-D deformation materials can be rolled up but do not reflect the nature of drape. It should be noted, however, that these and similar films will be suitable for certain embodiments of the invention where drapability is not required. For example, where only a flexible display is desired, such films can be rendered black or otherwise non-transparent for use as a substrate by coating it with a black Krylon paint.

It will be apparent from the following that while the principal advantages of the invention are realized by the presentation of a deformable liquid crystal display, a principal contributor to the realization of this advantage is the provision of an electrically addressable liquid crystal display on a single substrate. Electrically addressable displays on the market today employ at least two substrates which, as noted above, are generally rigid, with the liquid crystal sandwiched between them. These displays are, in general, manufactured by batch processing methods. In accordance with the preferred embodiments of the present invention, a display element on a single substrate is fabricated by a sequence of layers as may be placed on the substrate by coating, printing or lamination techniques suitable for the web processing methods necessary for low cost, high volume production. Fundamentally, these layers consist of a first conductive layer followed by a layer of an electrically responsive droplet dispersion such as a polymer dispersed cholesteric liquid crystal, followed next by a transparent conductive layer. Coating on textiles or other fabrics may require a planarization coating to at least partially smooth the surface. This may be followed by a preparation coating or sequence of such coatings to further smooth the surface of the fabric as well as adjust its color, resistivity, wetting and adhesive properties with respect to the first conductive layer. Insulation coatings are often needed between the cholesteric dispersion and electrodes to avoid electrical shorts between the electrodes. A durable protective layer is coated to finalize construction of the display element. In some cases an isolation layer is required between some of the coatings to avoid damage by subsequent coatings, such as may be caused by a chemical reaction between coating solvents or other components. Likewise, preparation coatings between various layers may be necessary to promote wetting and adhesion of the subsequent coat. In some embodiments, the coatings often serve multiple functions, such as where the first conductive coat may also serve as a preparation coat to smooth the surface.

The electro-optic layer can further consist of several coatings of cholesteric dispersions with different reflective colors or twist handedness as desired for multiple colors or high brightness. For color, enhanced brightness or infrared applications such as those described in U.S. Pat. No. 6,654,080, incorporated herein by reference, stacks of coatings arranged as disclosed therein can be employed in accordance with the instant invention. The coating of the upper conductive electrodes with a protective coat avoids the need to laminate an upper substrate. Such display configurations on a single substrate improve the flexibility of the display as well as its brightness and contrast. Such displays according to the invention exhibit improved ruggedness because the protective coat can be more difficult to delaminate than an upper laminated substrate.

While the invention will be described herein primarily in conjunction with the preferred use of cholesteric liquid crystals, any liquid crystal material that can be adapted to use in connection with the foregoing substrates will be suitable for use in accordance with the present invention. Such materials include, by way of example only, nematic, chiral nematic (cholesteric), smectic and ferroelectric smectic liquid crystal materials. They include materials which are bistable and those which are not bistable. They include cholesteric or chiral nematic liquid crystals having positive or negative dielectric anisotropy or a combination of negative and positive with a crossover frequency suitable for dual frequency addressing. They include cholesteric materials having pitch lengths reflecting in the visible spectrum as well as those having pitches reflecting outside the visible spectrum, including ultraviolet and infrared. Preferred liquid crystal materials for use in the present invention are bistable cholesteric (chiral nematic) liquid crystals having positive dielectric anisotropy. Especially preferred materials are nematic materials with a high birefringence and dielectric anisotropy with a chiral additive to twist the material to a pitch length to reflect in the visible spectrum such as BL061, BL048 and BL131 from EM Industries of Hawthorne, N.Y. These and other suitable materials will be apparent to those of ordinary skill in the art in view of the present disclosure.

As will be apparent to those of ordinary skill in the art in view of the instant disclosure, the liquid crystal material will preferably be present in the displays of the invention in the form of liquid crystalline layers comprised of a liquid crystal dispersion and, most preferably, a cholesteric droplet dispersion. There are many different approaches to the formation of a layer of liquid crystal droplets, some of which have been used for cholesteric liquid crystals. To form such a liquid crystal layer, the liquid crystal can be microencapsulated, formed into a layer of phase separated liquid crystal droplets, or formed into emulsified droplets of liquid crystal.

More specifically, one process suitable for forming liquid crystal layers for use in the invention is phase separation, which is basically a process that involves mixing the cholesteric liquid crystalline material with a pre-polymer solution then polymerizing the polymer under suitable conditions to form a dispersion of droplets in a polymer binder. Polymerization and, hence, droplet formation, occurs after the material mixture has been coated, either onto a temporary or interim substrate, or onto the display substrate itself. There are basically three types of polymerization techniques that can be used depending on the polymer (or monomer): (1) thermally induced phase separation (TIPS); (2) polymerization induced phase separation (PIPS); and, (3) solvent induced phase separation (SIPS).

The thermally induced phase separation (TIPS) process has been used to show that a cholesteric material will maintain its bistability and electro-optical features when encapsulated into a droplet structure as disclosed in, for example, U.S. Pat. No. 6,061,107, incorporated herein by reference. The TIPS system is a binary mixture of a liquid crystal and a thermoplastic polymer. At high temperatures, the polymer is melted and the materials are in solution. As temperature is lowered, the liquid crystal phase separates to form droplets as the polymer solidifies. The droplet size can be controlled by the cooling rate with smaller droplets being formed at faster cooling rates. TIPS is advantageous in controlling droplet size because cooling rates are easily adjusted. Furthermore, the system can be thermally cycled many times and different droplet sizes can be obtained in the same sample using different cooling rates. There are many thermoplastic polymers that can be used for this process. Some examples are PMMA (poly methyl methacrylate), which provides a tangential anchoring condition for the elongated liquid crystal molecules and PIEMB (poly isobutyl methacrylate), which provides a perpendicular anchoring condition. Other polymers suitable for use in this and the embodiments that follow would be apparent to those of ordinary skill in the art in view of the present disclosure.

Polymerization induced phase separation (PIPS) starts with a homogeneous mixture of a prepolymer (monomer) and a liquid crystal. As the monomers are polymerized, the liquid crystal phase separates from the polymer. The polymerization can be thermal-initiated or photo-initiated. In thermal-initiated polymerization, the monomers are typically combinations of epoxy resins and thiol curing agent, such as Epon 828 (Shell Chemical) or Capcure 3800 (Miller Stephenson Company). The mixture, coated at room temperature, can then be cured at an elevated temperature. In general, smaller droplets are formed at higher temperatures or higher concentrations of epoxy resins because of the higher reaction rate. In photo-initiated polymerization, monomers with acrylate or methyacrylate end groups, such as Norland 65 (which is a combination of acrylate monomers and photo-initiators), are used. Some photo-initiators are also needed. In sample preparation, the mixture is printed or coated then cured under the irradiation of UV light. Smaller droplets are formed under higher uv irradiation.

In the SIPS method, the initial material is a mixture of a liquid crystal and a thermoplastic dissolved in a common solvent. When the concentration of the solvent is sufficiently high, the components are homogeneously mixed. As the solvent evaporates, the system phase separates. The droplet size of the liquid crystal depends on the solvent evaporation rate with smaller droplets obtained at faster evaporation rates.

In accordance with the foregoing, those of ordinary skill in the art will be able to select suitable materials and methods for producing phase separated liquid crystal droplet layers for use in the present invention. In some cases, it may be preferable to use a combination of the PIPS, SIPS and TIPS processes. The PIPS, SIPS and TIPS methods and materials are well known in the art as disclosed in, for example, U.S. Pat. Nos. 4,688,900 and 4,684,771, incorporated herein by reference.

Another very different encapsulation process involves emulsification of a cholesteric liquid crystal in water with a waterborne polymer. Encapsulation of cholesteric liquid crystals by emulsification was practiced even before the invention of bistable cholesteric displays. As early as 1970, cholesteric materials were emulsified for making cholesteric thermal and electrical responsive coatings as discussed in U.S. Pat. No. 3,600,060, incorporated herein by reference. More recently, emulsification methods have been refined by Stevenson et al., at Kodak to make cholesteric droplets that are very uniform in size, as disclosed in U.S. Pat. 6,423,368 B1, incorporated herein by reference. The most common emulsification procedure basically involves a liquid crystal being dispersed in an aqueous bath containing a water-soluble binder material such as de-ionized gelatin, polyvinyl alcohol (PVA) or latex. Water acts as a solvent and dissolves the polymer to form a viscous solution. This aqueous solution does not dissolve the liquid crystal, and they phase separate. When a propeller blade at a sufficiently high speed stirs this system, the micron size liquid crystal droplets are formed. Smaller liquid crystal droplets form at higher stirring speeds as disclosed in P. Drzaic, *Liquid Crystal Dispersions*, World Scientific Publishing Co., Singapore (1995), incorporated by reference. The molecular weight of the water-soluble polymer is also a factor affecting the droplet size. After the droplets are formed, the emulsion is coated on a substrate and the water is allowed to evaporate. There are many different emulsification procedures. In preferred embodiments, one or more of PVA, gelatin and latex, preferably urethane based latex, are used to form the binder. Especially preferred polyurethane latex materials are Neo-Rez R967, and Witcobond W232 or W786. The emulsification method has the advantage that the droplet dispersions may contain a very high percentage of cholesteric material. As with the phase separated liquid crystal layers, those of ordinary skill in the art will be able to select suitable materials and methods for providing emulsified liquid crystal droplet layers for use in accordance with the present invention in view of the instant disclosure.

Microencapsulation is a yet another process for preparing droplet dispersions as seen, for example, in U.S. Pat. No. 6,271,898, incorporated herein by reference. While this procedure can be more complex and material sensitive, it can nonetheless provide more control over droplet size and molecular anchoring conditions for the cholesteric liquid crystal. In this case the liquid crystal droplet is coated by a shell isolating it from the binder. It may be possible to process the droplet particles in the form of a wet cake or slurry which is later dispersed in a suitable binder for coating. Other types of dispersions may be a regular array of polymer pockets filled with liquid crystalline material and sealed on the top by a phase separation process as disclosed in, for example, D. J. Broer et al, Society for Information Display 2004 Proceedings, pp 767.

In some embodiments, the substrate material will be formed by applying coated or printed layers directly on a deformable polymeric sheet that has a relatively smooth surface on or into which to incorporate the display elements. Alternatively, a fabric can be manufactured to have a smooth surface, such as with a neoprene coating that serves to partially planarize the surface of the fabric. However, in many embodiments of the invention the display will be formed on or integrally with substrates having rough surfaces such as cloth and similar fabric or textile materials. In embodiments where the surface of the substrate is undesirably rough, the substrate will require some degree of planarization in order to provide a smoother surface onto which the first electrode may be deposited. Smoothing out the surface helps to maintain a constant thickness for the cholesteric or other electro-optic layer. Planarization can be achieved in any number of ways, from the application of an organic layer, application of heat and/or mechanical pressure or the chemical modification of the surface. For example, one might smooth a substrate surface by application of a polymer coating followed by application of physical stress and heat, such as from a hot roll laminator. Alternatively, one can chemically treat the surface to melt or otherwise bring about a physical change in its degree of smoothness. Of course, as will be apparent to those of ordinary skill in the art, the degree of smoothness necessary is relative as long as it serves to help maintain a uniform thickness or gap between the electrodes so as to provide a uniform electric field and, consequently, drive uniformity across the entire display. Planarization need not render the substrate surface perfectly smooth or flat. In fact, in many embodiments the electrodes and liquid crystal layers of the displays of the invention will follow the minute contours of a fabric substrate, with the planarization layer or other planarization means functioning to eliminate only the most dramatic fluctuations in the substrate surface. Thus, these and other suitable means of planarizing (i.e., smoothing out) the substrate surface will be apparent to those of ordinary skill in the art in view of the instant disclosure.

A preferred manner of planarizing the substrate surface in accordance with the invention is the addition of a planarization layer. A planarization layer is a coating of material which, when applied to the substrate, will tend to smooth out the most dramatic fluctuations in the substrate so as to provide a generally smooth, though not necessarily flat, surface onto which to deposit the conducting electrodes. Preferred materials for use as a planarization layer in accordance with the invention are gelatin, neoprene and latex materials such NeoRez R967 available from NeoResins, Mass. The planarization layer also may be a polymeric sheet such as PET laminated onto the substrate.

As noted, the liquid crystal layer will, in the preferred embodiments, be bounded by conducting electrodes. The electrodes need not be identical. For example, in many embodiments, the electrode on the non-viewing side of the liquid crystal will be black or some other color, while the electrode on the view side will be transparent. In other embodiments, the electrodes on both sides of the liquid crystal layer will be transparent. In other embodiments still, an electrode or array of electrodes can be formed integrally with the substrate or the substrate itself can form one of the electrodes. An advantage to being able to use fabric substrates is that it enables greater flexibility in the manner in which the display can be configured. There are potentially many methods of applying and patterning the conductors. The conductors may be printed in some specified pattern using ink jet, screen or off-set printing. Alternatively the conducting materials may by sprayed or coated onto the fabric using a mask, stencil or pretreating the surface to form a chemical mask which allows the electrode material to only adhere to certain areas. In some cases it may be desirable to first lay down a uniform conducting coat and subsequently pattern the layer by chemically or mechanically deactivating regions of conductive material. In fact, it is contemplated that even the substrate itself can be manufactured as the conductor. For example, some flexible plastic materials are manufactured with an indium tin oxide (ITO) coating that may be patterned for use as electrodes. Suitable electrode materials for application to the substrates of the invention will be apparent to those of ordinary skill in the art in view of the instant disclosure and include conducting polymers, carbon nanotubes, metal or carbon conductive inks, ITO and the like. Electrode materials which are self leveling and which can be used in suitable thicknesses to obviate the need for a planarization layer are particularly desirable. Examples of materials for use as conducting electrodes in accordance with the present invention include Agfa conducting polymers ELP-3040, S300, and S2500 available from Agfa-Gevaert N.V., Belguim; Carbon Nanotube materials are available from EiKos,Inc., Franklin Mass.

The aforementioned electrodes can be patterned, formed into pixels of varying shapes or sizes, aligned into rows and columns so as to form a passive matrix and so on, all as will be apparent to those of ordinary skill in the art in view of the instant disclosure. Any means for addressing the liquid crystal known in the art and adaptable to a display having the deformability of the instant invention can be employed. In the preferred electrically addressable displays, the means for addressing the liquid crystal will be drive and control electronics operatively linked to the electrodes for application of driving voltages across the liquid crystal material in accordance with any suitable drive scheme known to those of ordinary skill in the art. Examples of suitable drive schemes include, but are not limited to, the conventional drive scheme disclosed in U.S. Pat. No. 5,644,330 implemented with either bipolar or unipolar drive chips, the dynamic drive scheme disclosed in U.S. Pat. Nos. 5,748,277 or 6,154,190 for faster or lower temperature response, or the cumulative drive scheme disclosed in U.S. Pat. No. 6,133,895, for video response, all of which are incorporated herein by reference. Alternatively, the means for addressing can be an optical method whereby the image is written on the display with white light or laser light in a manner such as disclosed in H. Yoshida et al., Journal of the SID, Vol. 5/3, 269–274, (1997), also incorporated herein by reference. Of course, in these embodiments, the displays can be fabricated without patterned electrodes.

In a preferred configuration, a high resolution display device in accordance with the invention is configured where the first conducting polymer is printed or otherwise patterned in the form of parallel strips to form rows of parallel conducting electrodes. The droplet dispersion is then coated on top of the rows of conductors, followed by a transparent conductor which is then printed, or otherwise coated and patterned on top of the droplet dispersion in the form of conductive strips (columns) in a direction perpendicular to the rows of conductors that are under the dispersion. In this way, a row and column matrix of electrodes is formed with the cholesteric dispersion in between. Voltage pulses are then multiplexed in such a way to selectively address each pixel of the display formed by the intersection of each row and column. When a high-resolution image is addressed on the fabric and the voltage removed, the image will be retained indefinitely until readdressed to form another image.

In carrying out the invention, it will often be desirable to employ an insulation layer or layers between the electrodes in order to insulate the conductors from each other and thereby minimize the potential for shorting. Accordingly, for purposes of the instant invention it is desirable to select materials that can be coated, printed, sprayed or otherwise laid down in a layer before and/or after the electro-optically responsive liquid crystal layer. The insulation layer must not significantly detract from the deformability or optics of the display. In accordance with the preferred embodiments of the invention, materials such as gelatin or latex are employed. Some particularly preferred insulating materials are polyurethane latex materials such as WITCOBOND W232 (available from Crompton Corporation, CT). Although an insulation layer such as gelatin is optional, experiments show that it leads to a decrease in the switching voltage on the order of 10–15 volts (f=250 Hz) when the liquid crystal layer is a cholesteric droplet dispersion. Without being bound by theory, this may be because the gelatin layer is enhancing the dielectric properties of the emulsion through the increase of the dielectric constant.

As noted above, the use of one or more durable protective coatings obviates the need to laminate a second substrate, thereby enhancing both the flexibility and durability of the display. Desirable protective coatings will be materials that will provide a tough, scratch and ware resistant coating over at least a portion, and preferably all, of the uppermost surface of the display, but not materially interfere with the optics of the system. Likewise, the most desirable materials will maintain the deformability of the system. Those of ordinary skill in the art will be able to select suitable materials in view of the instant disclosure. Preferred materials include acrylic or silicone paints, UV curable adhesives, PVA, latex materials and the like. Because some protective coatings will include solvents or other components which may be harmful to the electrodes or other elements of the display, in carrying out the invention it may be desirable to select an isolation layer material that will protect the other display elements from harmful components of the protective coat, or to include an additional protective material as an isolation layer interposed between the protective coat and the other display elements.

As will be apparent to those of ordinary skill in the art, displays according to the invention can be formed in many different configurations using some or all of the foregoing component layers. For example, the display materials may only appear on one side of the fabric leaving the other side untouched, or the display may be partially imbibed into and integrally formed with the substrate. Of course, the minimum requirements for the electrically addressable displays of the invention are the incorporation of a liquid crystal layer between a pair of conducting electrodes onto or into the substrate. Beyond this, there are multiple possible configurations and combinations which can effectively take advantage of the flexibility and/or drapability of the substrates according to the invention as will be apparent to those of ordinary skill in the art in view of the present disclosure.

The fabrication of these display devices involves printing, coating or other deposition means to incorporate the liquid crystal material, display electrodes as well as any insulating, isolation or other coatings into or onto a substrate in a manner that will allow the display to deform with the substrate. In view of the instant disclosure those of ordinary skill in the art will be able to select and employ suitable coating, printing and deposition techniques including, but not limited to, air brushing, ink jet, spin coating and spray printing, optionally in conjunction with various masks or stencils known in the art, screen printing, photolithography, chemical masking and so on, depending upon the particular substrates and display elements used. It is contemplated that any contact or non-contact method of applying coatings and conductors known in the art will be suitable for use in accordance with the instant disclosure.

In carrying out the invention it will also be possible to prepare a display on a remote substrate and then transfer it to the desired substrate such as a drapable fabric. In this case, a sequence of multiple coatings involving droplet dispersions, conductive coatings, and any desirable insulation coatings, isolation coatings, etc. that are needed to formulate a complete display device are coated on a temporary substrate from which the coated sequence can be removed upon drying or curing. The removed film now is a display element in itself without any substrate. The display film can then be laminated onto any object or material to which electrodes can be applied for connection to drive electronics. The casting or base layer of the display film may be used for printing all or a portion of the drive electronics as the printed electronic technology permits.

A multiple color reflective display can be fabricated by replacing the single cholesteric dispersion layer with two or more dispersion layers, each of a different reflective color layered on top of one another with conducting electrodes in between. A full color display can be made by layering red, R, green, G, and blue, B. With only one electrode layer between each color, the display is electronically addressed by a shared electrode addressing scheme possible with bistable cholesteric dispersions. Added brightness may be achieved if each of the R, G and B layers contains a stacked left twist and right twist dispersion layer. An infrared reflective display is possible where at least one of the droplet dispersion layers reflects in the infrared, such as might be used for night vision purposes. A multiple color display can also be prepared with a single dispersion layer wherein each pixel is divided into different primary colors such as red, green and blue, for additive color mixing. The patterned colors can be achieved as described, for example, U.S. Pat. No. 5,668,614, incorporated herein by reference.Sep. 16, 2004

Still further, a self-powered display may be achieved by using a solar panel as the substrate or a component of the substrate whereby light that is not reflected by the cholesteric material can be absorbed in the solar panel for conversion into electrical power for powering the display. It is also conceived that an active matrix substrate could be employed to create an actively driven cholesteric display, whereby the various display elements are sequentially layered on the active backplane. Further still, an optically addressed display is achieved by placing a photoconductive sheet over the lower conducting electrode. With a continuous voltage applied to the electrodes, light impinging the display film will locally alter the resistivity of the photoconductor and drive the display film. Such a display construction avoids the need of patterning the electrodes. The display can be addressed by an image suitably focused on the film, or written with a scanned laser beam as described in the publication "Reflective Display with Photoconductive Layer and Bistable Reflective Cholesteric Mixture" *Journal of the SID*, Vol. 5/3, pages 269–274 (1997) by J. Yoshida et al., incorporated herein by reference. Of course, other veneered stacks are possible depending on desired display

DETAILED DESCRIPTION OF THE PREFERRED EMBODIMENTS

FIGS. 1–5 illustrate various preferred display configurations according to the invention. FIG. 1 is a profile illustration of a cholesteric reflective display on a highly drapable fabric. The display 100 is a stack of layers that are coated, printed or laminated on a fabric substrate 101 made of fibrous material. The substrate 101 may be drapable and either opaque or transparent, consisting of natural or man-made fibers. The fabric material 101 may be of woven or non-woven fibers or may be a composite such as a fiber-reinforced thermoplastic material.

Because the surface of fabric is often very rough, it may be necessary to have a planarization layer 110. The planarization layer may be coated, laminated or may be made to be an integral part of the fabric. In addition to at least partially smoothing out the surface, the planarization layer may serve several other purposes, such as adjusting the wetting and adhesion characteristics for the next layer of the sequence, adjusting the color, refractive index or other optical property of the film and so on. Layer 111 is a preparation layer that overlays layer 110 if more planarization is required or if 110 does not present a suitable surface for the first conducting electrode 120. Coating is a preferred means of casting layer 111 over 110 and more than one coating may be required for unusually rough surfaces. Layer 111 may also serve as an insulating layer if the previous layer 110 is conductive. As shown, however, the next layer 120 is the first or lower conducting electrode. Normally, in the case of fabric substrates, the substrate is opaque. In this case the conducting electrode 120 can likewise be opaque, although it should not be reflective. Carbon based materials, such as conducting polymers are suitable as long at they provide sufficient conductivity; for example, less than 1000 Ohms/square resistivity, a parameter also controlled by the thickness of the layer. Carbon based materials are often desirable in that, often, they can be screen, inkjet or otherwise printed to form a desired electrode pattern.

If printing the conducting layer is not an option, it may be coated as a continuous sheet and then subsequently patterned. For example, a conducting polymer can be first coated then patterned by printing a deactivating agent with the desired pattern over the conducting polymer. An insulating layer 121 is coated over the conducting polymer in cases where the liquid crystal layer 130 does not provide sufficient insulation between the upper conductor 140 and the lower conductor 120 to prevent shorting.

The next layer in the sequence is the liquid crystal layer 130 which, as described above, can be a dispersion or an array of polymer walls filled with liquid crystal. As described above, a liquid crystal dispersion material can be made from any of several different processes such as, an emulsion, phase separation, or microencapsulation process. Preferred processes are dispersions prepared from latex emulsion, a PIPS phase separation or gelatin microencapsulation process as these materials can be easily coated or printed. If bistability is desired, the droplet size of the cholesteric dispersion should be large enough to allow a stable focal conic and planar texture, typically greater than 1.0 micron. The thickness of this coating determines the drive voltage of the display as well as the display brightness. To optimize brightness, it is desired that this layer be at least 4.0 microns in thickness. However, to maintain moderate to low drive voltages it is desirably less than 15 microns depending on the physical properties of the liquid crystal material. As a possible alternate to a dispersion, an array of polymer walls filled with liquid crystal can be employed, although this would require more coatings and processing.

An isolation coating 131 is coated over the liquid crystal layer in cases where it is needed to prevent material from the second or upper conducting layer from penetrating into the liquid crystal layer. Layer 131 may also serve as an insulation layer or as a wetting and adhesion layer for the transparent or upper conducting electrode. A transparent conducting layer 140 is then printed or coated and suitably patterned to serve as the upper electrode. Transparent conducting polymers or carbon nanotubes are preferred materials suitable for this purpose. The transparency to conductivity ratio depends on the thickness of the coating. If the response speed of the display is not an issue, a resistivity as high as a few thousand Ohms/square has been found suitable to drive cholesteric dispersions. Finally, in order to improve the ruggedness of the display and to protect the display elements from the environment, the transparent conductor 140 is overlaid with a flexible protective layer 150. The protective layer 150 may be applied in one or more layers by coating, printing, laminating or a combination thereof.

Figure 2:
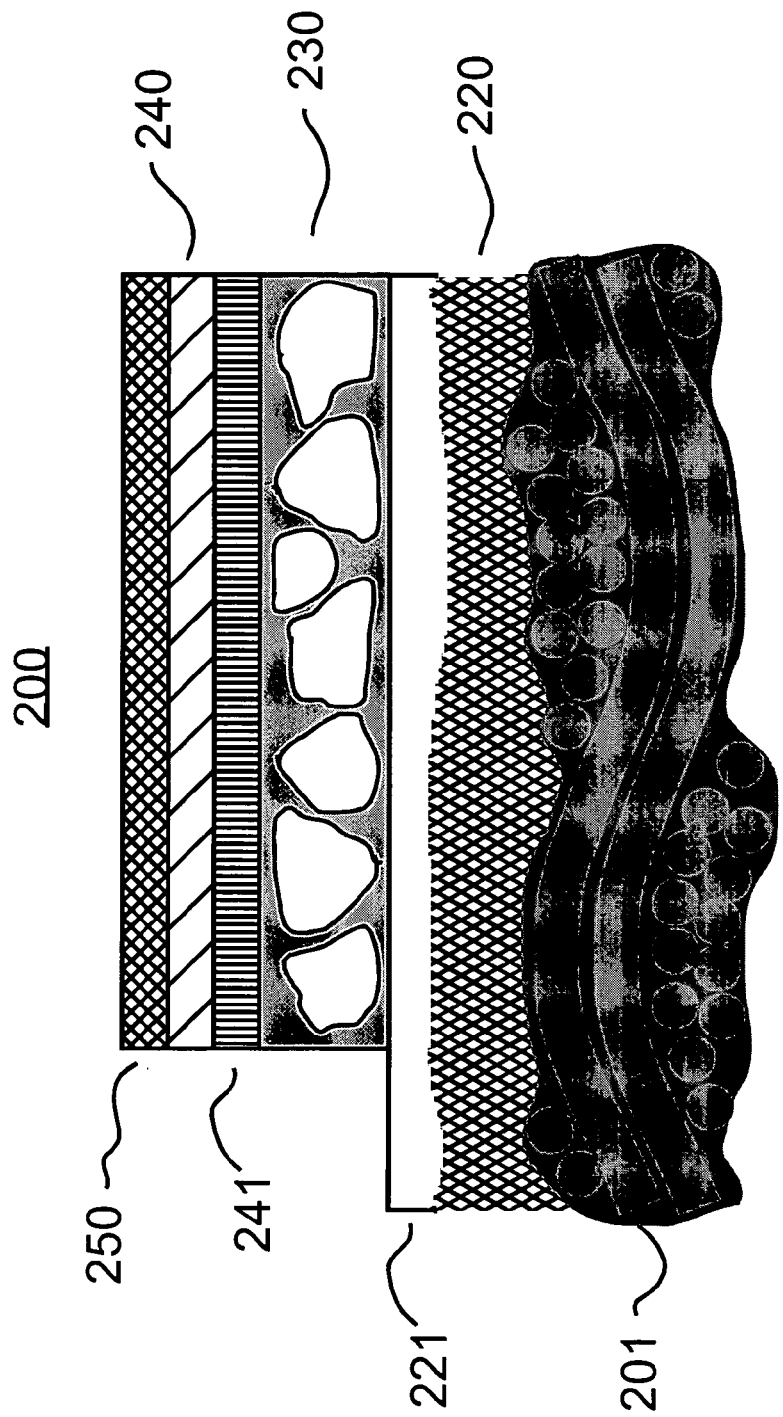
FIG. 2 is a diagrammatic cross-sectional illustration of another display configuration according to the invention wherein some display layers share functionality.

In FIG. 2 there is shown an illustration of a cholesteric reflective display on a drapable fabric, where the number of layers is advantageously reduced by combining the functionality of the electrodes and planarization layers. The display 200 is a stack of layers that are coated, printed or laminated on a fabric substrate made of fibrous or other deformable material. The substrate 201 may be a drapable fabric consisting of natural or man-made fibers which is either opaque or transparent. The fabric material may be of woven or non-woven fibers or may be a composite such as a fiber-reinforced thermoplastic material. In this embodiment, the planarization layer 220 is conductive to serve both as an electrode and a planarization layer, as well as to prepare the surface for the insulating layer 221 where needed. The conductive layer 220 may be coated, laminated or may be made to be an integral part of the fabric. The transparent conducting materials such as conducting polymers or carbon nanotubes may be printed to a suitable pattern. The conductive layer can be patterned by local deactivation with UV or printing a deactivating solution such as, for example, bleach, to locally deactivate a conducting polymer. Following a coating or printing of the insulation layer 221 the liquid crystal containing layer 230 is cast as illustrated. This layer maybe a droplet dispersion, such as a polymer dispersed cholesteric liquid crystal, or an array of confining polymer cups to hold the liquid crystalline material. The transparent conducting electrode 240 completes the electro-optic component of the display stack which is then over coated or laminated with a protective layer, 250.

Figure 3:
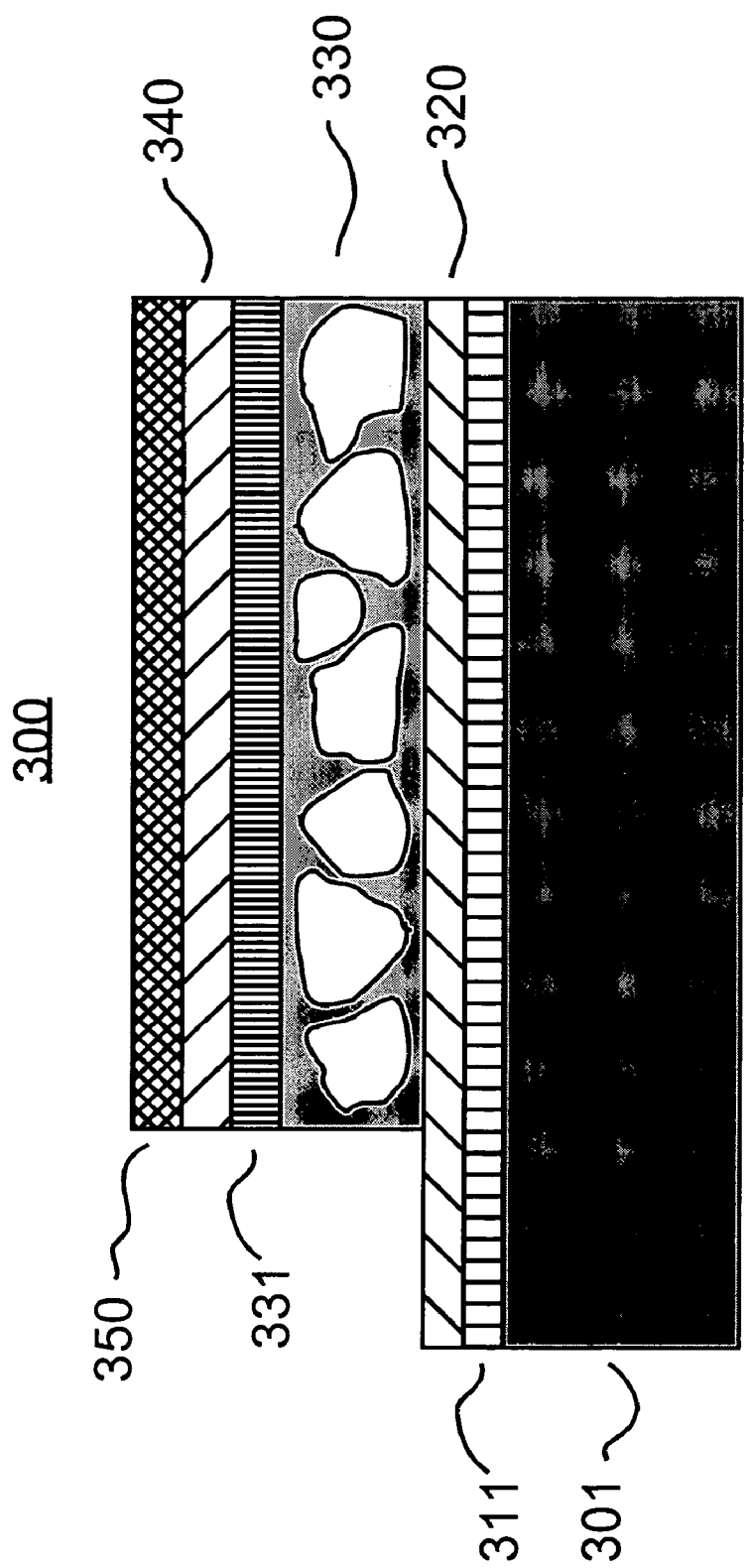
FIG. 3 is a diagrammatic cross-sectional illustration of another display configuration according to the invention wherein the display elements are coated, printed or laminated sequentially as layers on a non-fibrous and non-transparent substrate.

FIG. 3 is a profile illustration of a cholesteric reflective display 300 on a flexible non-fiberous and non-transparent sheet substrate 301, such as a thermoplastic, composite or cross-linked polymeric material. A preparation layer 311 is often required to provide improved planarization of the surface, adjust the color and light absorption of the substrate and present a suitable surface for wetting and attaching the lower conducting electrode layer 320. A layer of cholesteric materials 330 suitably confined such as in polymer dispersion, is then cast onto the conductive layer followed by an isolation layer 331 coated over layer 330. The isolation layer provides a surface on which to coat or print the transparent conducting electrode layer 340, as well as to insulate from shorts and protect the liquid crystal layer. A protective layer 350 is then coated to protect the electro-optic elements below it from the environment.

Figure 4:
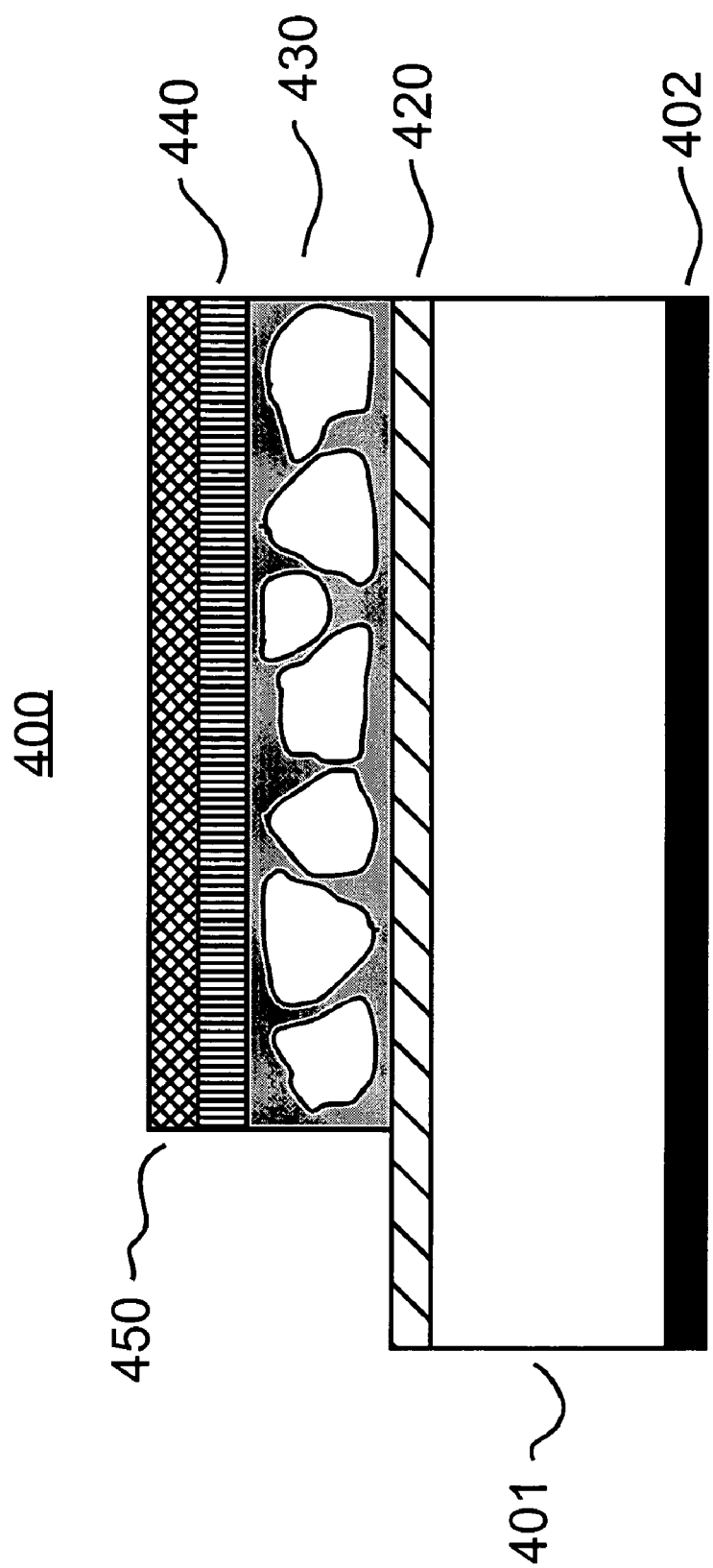
FIG. 4 is a diagrammatic cross-sectional illustration of another display configuration according to the invention wherein the display elements are coated printed or laminated sequentially as layers on a non-fibrous and non-transparent substrate prepared, in part, from transparent materials.

FIG. 4 is a profile view of a cholesteric display 400 where the non-transparent substrate 401 is made from transparent material such as polyester (PET) or polycarbonate (PC) coated on the lower side with and ink or paint 402 to prevent light from passing through the film. The ink or paint coating is preferably black. The upper side of the transparent material contains the conducting layer 420 which, in this case, may be indium tin oxide (ITO) that is pre-coated and pre-etched. A cholesteric liquid crystal dispersion 430 then is coated over the conducting electrode layer 420 followed by a printing of the transparent electrode layer 440 and protective coating 450.

Figure 5:
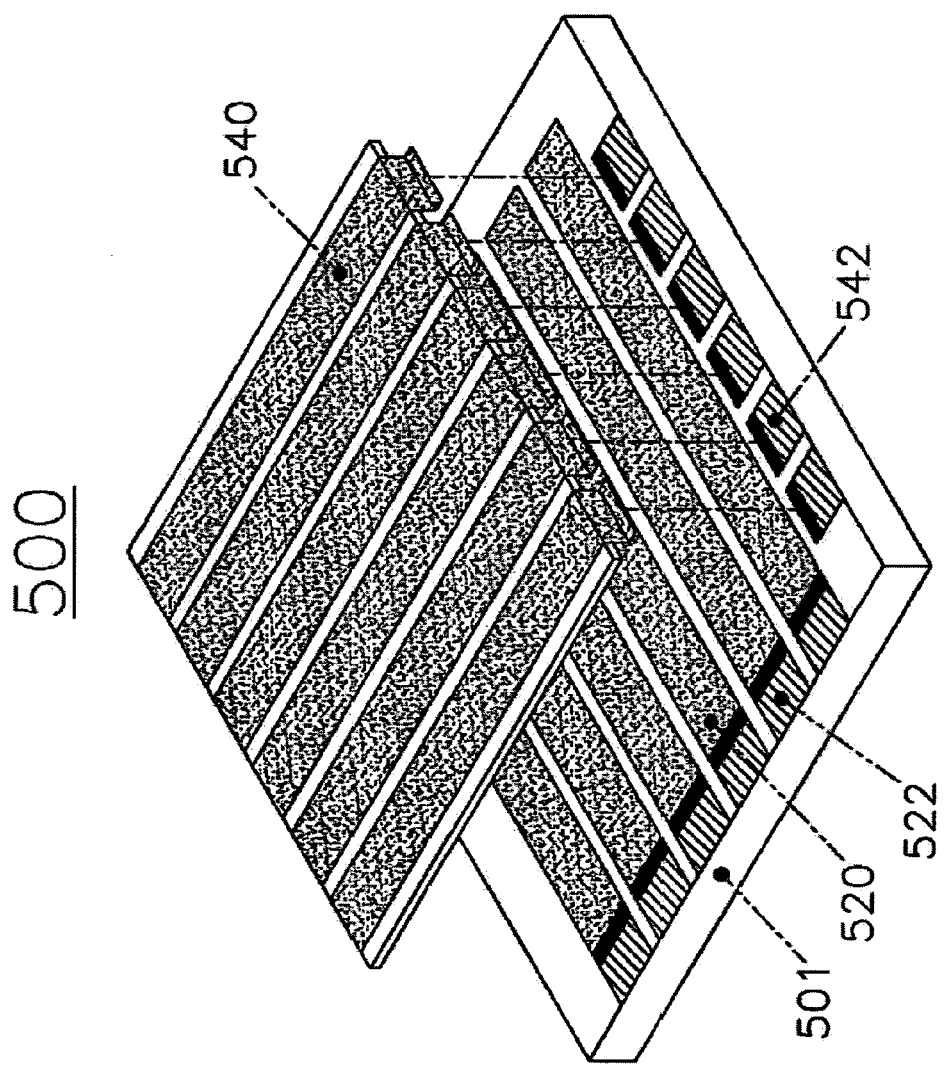
FIG. 5 is a three-dimensional diagrammatic sketch of a preferred display configuration according to the invention illustrating an exploded view of how the row and column electrodes are connected to tabs on the substrate.

FIG. 5 is a three-dimensional drawing 500 of a passive matrix configuration illustrating, in an exploded view, how the conducting transparent electrodes 540 patterned as rows, are electrically connected to conducting tabs 542 attached to the substrate 501. The column electrodes 520 are electrically connected to tabs 522, which also are attached to the substrate 501. The tabs are used for interconnecting drive electronics, not shown. Since the tabs for both of the columns 520 and the rows 540 are disposed on the substrate 501, attaching the drive electronics is greatly simplify. It will be apparent that the intermediate layers of the display, including the cholesteric dispersion layer, are not shown in the exploded view.

It will be apparent that the foregoing description in connection with FIGS. 1–5 is intended to illustrate the preferred cell configurations using components necessary for an electrically addressable display according to the invention. In each of the foregoing embodiments, it may be necessary or desirable to include any or all of the additional display components described above, and to coat a durable protective coat or series of coatings on top of the upper transparent conductor to insure a rugged display that is protected against the environment. Thus, although the most basic electro-optic elements of the preferred displays of the invention are a deformable substrate, a liquid crystal layer and a pair of electrodes, preferred display configurations shown in FIG. 1–5 include planarization layers to smooth the surface of the fabric or other substrate, preparation layers that serve multiple purposes as needed to further smooth the surface, adjust the surfaces wetting and adhesion characteristics for coating the next layer in the sequence, and/or to adjust the optical characteristics needed in the display, insulation layers to prevent electrical shorts between the lower conductor and upper transparent conductor, and isolation layers as needed to prevent chemical interaction between layers or suitably adjust wetting and adhesion characteristics.

Figure 6:
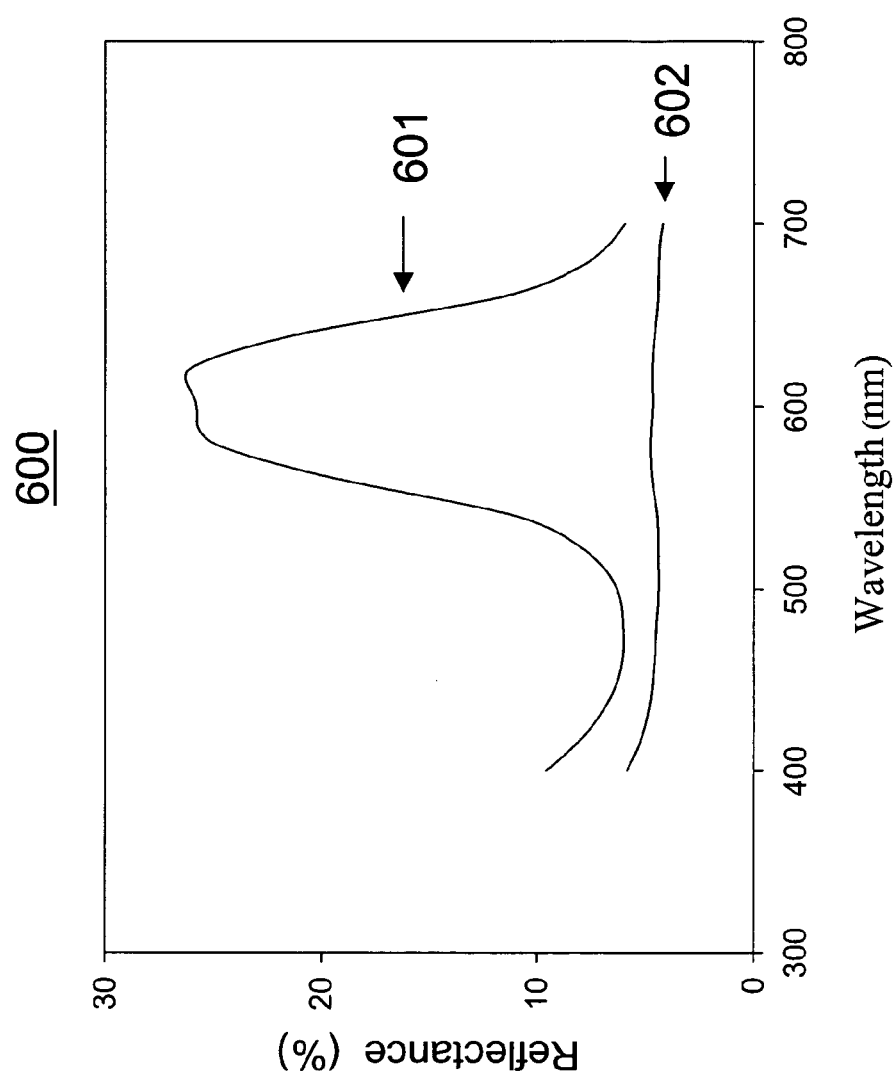
FIG. 6 is a graph of the spectral reflectivity of the two states of the cholesteric display of Example 1.
Figure 7:
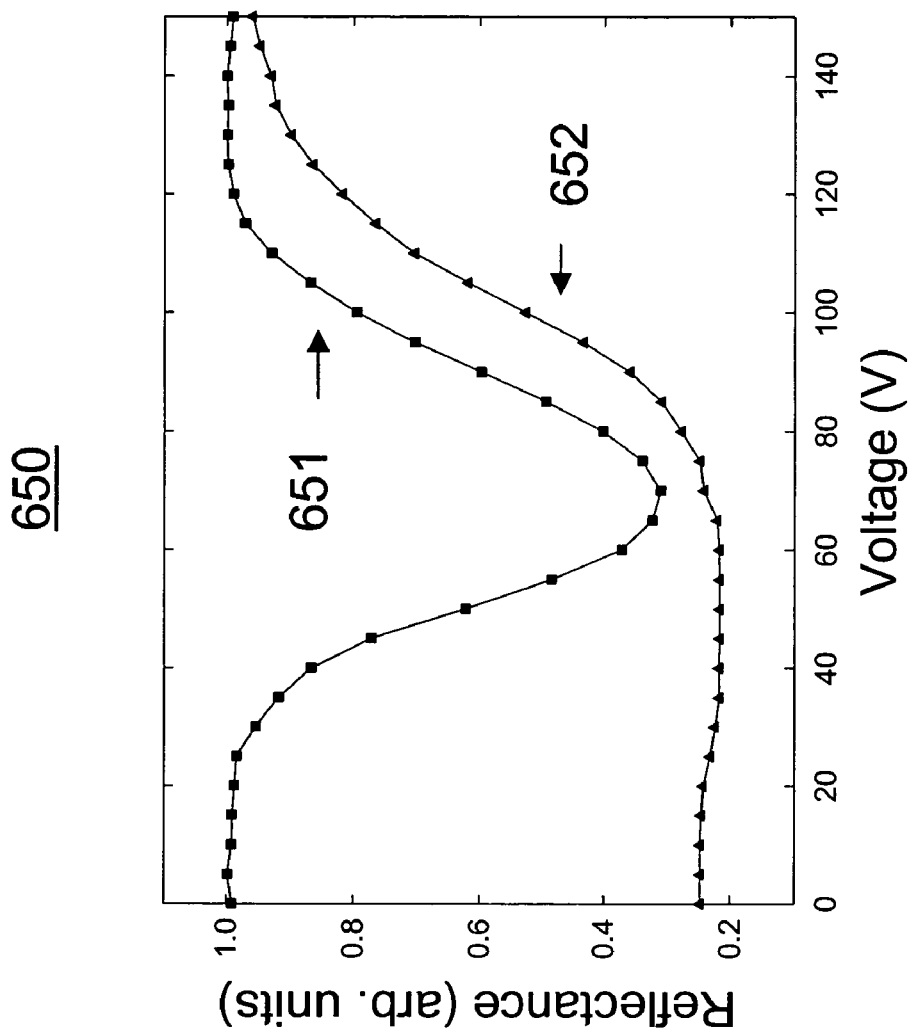
FIG. 7 is the electro-optic response of the display of Example 1.

FIGS. 6–9 show the measured optical and electro-optical characteristics of fabricated displays described in the Examples. FIG. 6 shows the reflectance versus wavelength measured from the cholesteric display on a fabric substrate of Example 1. The spectral reflectance from the planar texture 601 and from the focal conic texture 602 is shown in the experimental plot 600. FIG. 7 is the electro-optic response curve showing the reflectance versus the voltage measured from the display on fabric of Example 1. Curve 651 shows the response of a voltage pulse when the sample is initially in the reflective planar texture while curve 652 shows the response of a voltage pulse when the sample is initially in the focal conic state.

Figure 8:
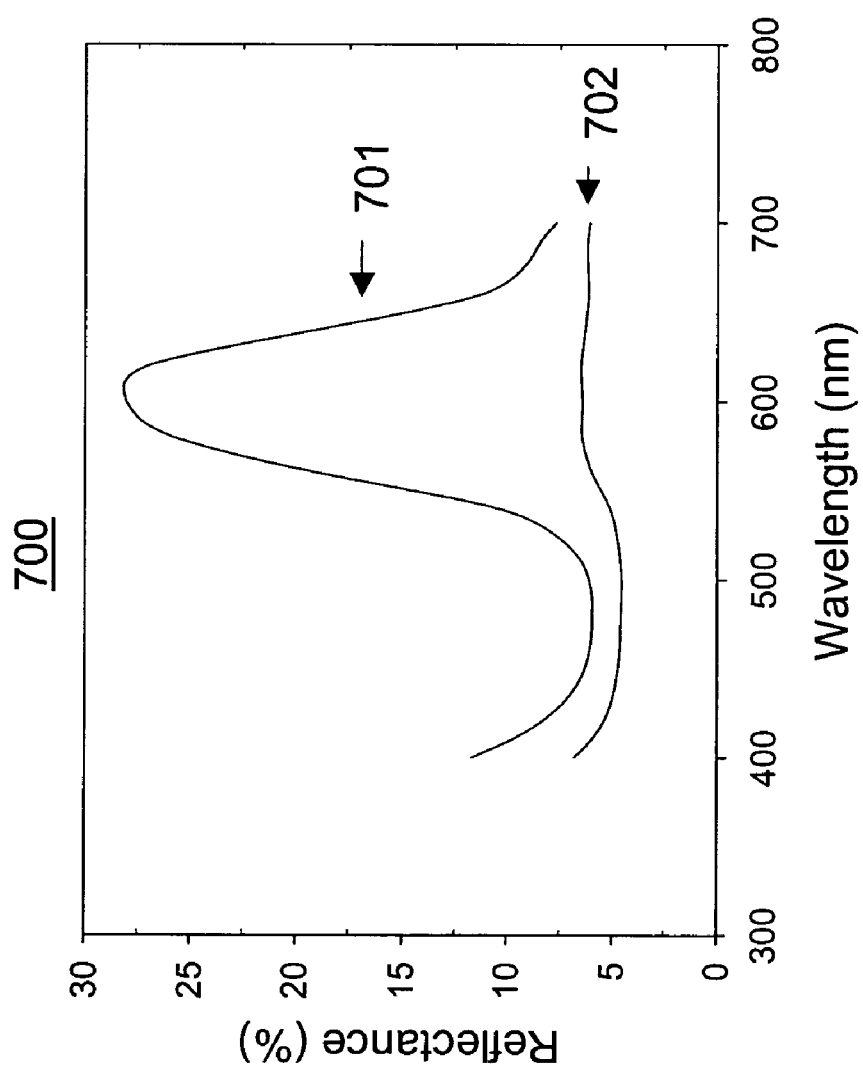
FIG. 8 is a graph of the spectral reflectivity of the two states of the cholesteric display in Example 12.
Figure 9:
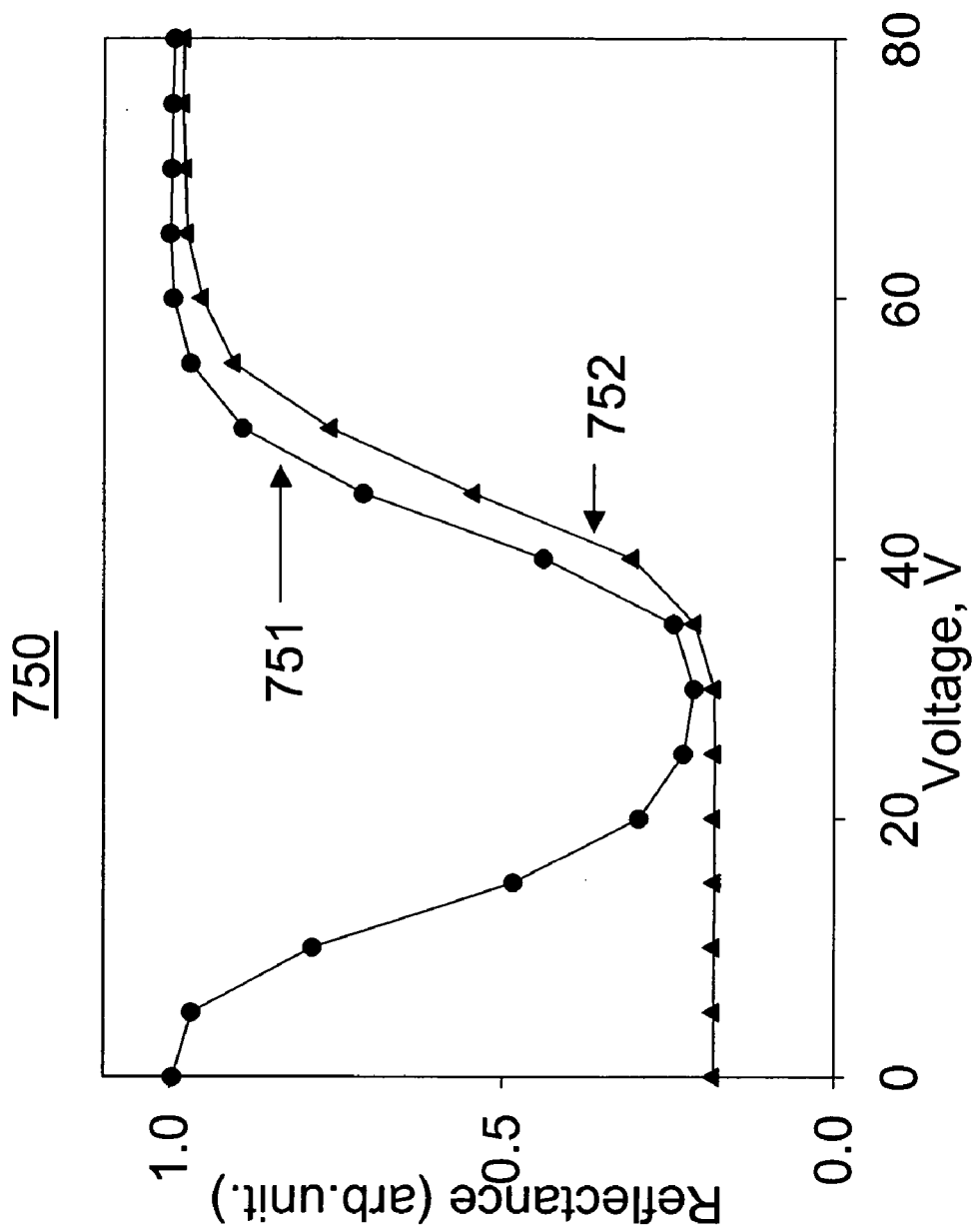
FIG. 9 is the electro-optic response of the display of Example 12.

FIG. 8 shows the reflectance versus wavelength measured from the cholesteric display on a plastic substrate of Example 12. The spectral reflectance from the planar texture 701 and from the focal conic texture 702 is shown in the experimental plot 700. FIG. 9 is the electro-optic response curve showing the reflectance versus the voltage measured from the display on a plastic substrate of Example 12. Curve 751 shows the response of a voltage pulse when the sample is initially in the reflective planar texture while curve 752 shows the response of a voltage pulse when the sample is initially in the focal conic state.

Figure 10:
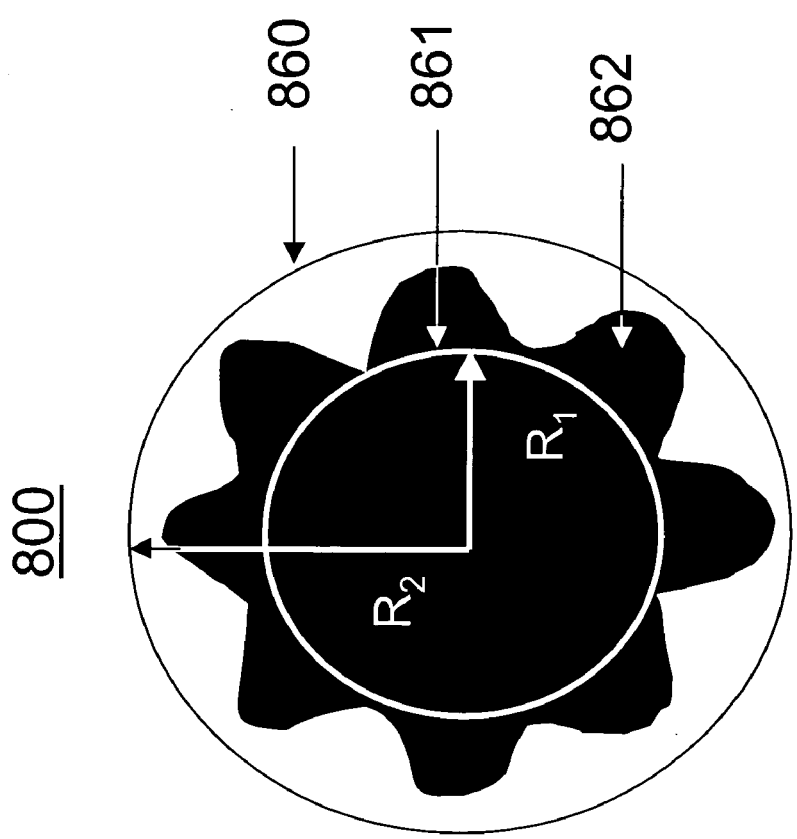
FIG. 10 is diagrammatic sketch illustrating the parameters in the determination of the drape coefficient for substrates suitable for use in the preferred embodiments of the invention.

FIG. 10 is a diagrammatic illustration of the parameters used in the determination of the drape coefficient. In illustration 800, a fabric sheet is cut on a flat surface to a circle

860 of radius $R_2$. The shaded area 862 represents a projection, $S_P$ as viewed from above, of fabric draped over a pedestal in the shape of a disk 861 of radius $R_1$. The drape coefficient is calculated from the equation $100 (S_p - \pi R_1^2) / (\pi R_2^2 - \pi R_1^2)$.

EXAMPLE 1

An operable 4×1 pixel cholesteric display was made by coating and printing the various display elements on a fabric substrate. The fabric substrate was a black woven rayon fabric (150 micron thick) coated with neoprene available from Thor Labs (Newton, N.J.). The neoprene coating served to partially planarize the fabric surface. The fabric was rinsed with the mixture of water and isopropanol (90:10%) to make the surface hydrophilic. A preparation layer of aqueous polyurethane dispersion, NeoRez R967 available from NeoResins, MA was deposited on the fabric with a Meyer rod # 8 (available from Chemsultants International, Mentor, Ohio) technique and allowed to dry at room temperature. The dry thickness of the preparation layer was approximately 10–12 microns. The preparation layer serves to further smooth the rather rough neoprene surface and to provide a chemical barrier for the next casting layer. A layer of conductive polymer (ELP-3040 available from Agfa-Gevaert, Belgium) was screen printed on the preparation layer as 4 pixels 25 mm wide, 18 mm long spaced 2 mm apart to serve as the electrodes of the passive matrix display. After coating the conducting polymer, it was cured at 100° C. for 10 minutes. The sheet resistivity of the conductive polymer layer was 800 Ω/sq. A thin insulation layer (1–2 µm) of the polyurethane dispersion NeoRez R967 was cast on the conductive layer using a doctor blade technique. A layer of encapsulated cholesteric liquid crystal in polymer binder was formed from a water-based emulsion and coated on the insulation layer using a doctor blade having a 25 micron gap and allowed to dry for 1 hour at room temperature. The thickness of encapsulated liquid crystal layer was approximately 8–10 µm. The ratio between liquid crystal and binder was from 4:1 to 5:1. The emulsion was prepared from 0.4 g of yellow CLC KLC 19 (EM Industries of Hawthorne, NY) and 0.27 g of NeoRez R967. To improve the display contrast, a small amount (0.3–0.4 wt %) of 4-hexylamino-4'-nitro-azobenzene dye was added to the liquid crystal before emulsification. The mixture was emulsified with a homogenizer (PowerGen 700) at 1000 rpm for 3–4 min at room temperature. The emulsified CLC formed droplets which are about 3–15 µm in diameter. The second conductive electrode was formed from a highly transparent conductive polymer, Dipcoat, available from Agfa. A thin layer of the conductive polymer was deposited using air brushing over a mask and cured at room temperature. The mask provided a continuous top electrode for the passive matrix display. The bistable cholesteric material could be addressed to the planar (yellow reflective) texture by application of 125 volts or to the focal conic (non-reflective texture) with application of 70 volts with frequency of 50 Hz and pulse width of 20 ms. The electro-optical curves are shown in FIG. 7. The data for reflectance vs. wavelength is presented in FIG. 6 with a contrast ratio of 12:1 and brightness of 26%.

EXAMPLE 2

An operable 4×1 pixel cholesteric display was made by coating and printing the various display elements on a fabric substrate. The sequence of the layers and materials are the same as in the Example 1 except that for the display protection, a clear coat of polyurethane dispersion WITCOBOND W232 (available from Crompton Corporation, CT) was deposited on the top of the second conductive electrode using a doctor blade. The use of the transparent layer of WITCOBOND W232 with thickness approximately of 5–10 microns as a clear coat allowed one to increase the transmission due to the refractive index matching.

EXAMPLE 3

An operable 4×1 pixel cholesteric display was made by coating and printing the various display elements on a fabric substrate. The sequence of the layers and materials are the same as in the Example 1 except that the second conductive electrode was made of the transparent conductive polymer 2500 available from Agfa. A thin layer of the conductive polymer was deposited using air brushing over a mask and cured at 45° C. for 3 min.

EXAMPLE 4

An operable single pixel cholesteric display was made by coating and printing the various display elements on a fabric substrate. The sequence of the layers and materials are the same as in the Example 1 except the following. The first conductive electrode was made of the conductive polymer ELP-3040 and formed as one pixel electrode and was deposited with a Meyer rod #12. Two coatings of conductive polymers were deposited to reach desirable conductivity of the electrode. The preparation layer was coated from 5 wt % aqueous solution of Hi-Pure gelatin (available from Norland Products Inc.) using the Meyer rod #12 and dried at room temperature for 30 min. The second conductive electrode of conductive polymer Dipcoat was spin coated at 2000 rpm for 60 s and cured at room temperature for an hour. The bistable cholesteric material could be addressed to the planar (yellow reflective) texture by application of 170 volts or to the focal conic (non-reflective texture) with application of 60 volts with frequency of 250 Hz. The display film had a brightness of 31% at a wavelength of 590 nm.

EXAMPLE 5

An operable 4×1 pixel cholesteric display was made by coating and printing the various display elements on a fabric substrate. The sequence of the layers and materials are the same as in the Example 4 except the following. The first conductive electrode of ELP-3040 was screen printed and patterned to form the row of 4 pixels as described in the Example 1. The bistable cholesteric material could be addressed to the planar (yellow reflective) texture by application of 150 volts or to the focal conic (non-reflective texture) with application of 50 volts with frequency of 1 Hz. The display film had a brightness of 27% at a wavelength of 610 nm.

EXAMPLE 6

An operable 16×16 pixel passive matrix cholesteric display was made by coating and printing the various display elements on a fabric substrate. The sequence of the layers and materials are the same as in the Example 1 except that first and second conductive electrodes were patterned to provide a 256 pixel display. The first electrode, made of conductive polymer ELP-3040, was screen printed on the preparation layer as 5 mm wide, 15 cm long strips spaced 1 mm apart to serve as the column electrodes of the passive matrix display. The second conductive electrode made of conductive polymer Dipcoat was deposited using air brushing over a mask and cured at room temperature. The mask was patterned to provide 5 mm wide, 15 cm long strips spaced 1 mm apart to form the row electrodes of the passive matrix display. Attached to the drive electronics and driven with an image using a cumulative drive scheme as disclosed in U.S. Pat. No. 6,133,895, the bistable cholesteric material could be addressed to the planar (yellow reflective) texture by application of 140 volts or to the focal conic (non-reflective texture) with application of 105 volts.

EXAMPLE 7

An operable 16×16 pixel passive matrix cholesteric display was made by coating and printing the various display elements on a fabric substrate. The sequence of the layers and materials are the same as in the Example 6 except that for display protection, a clear coat of polyurethane dispersion WITCOBOND W232 was deposited on the top of the second conductive electrode using a doctor blade.

EXAMPLE 8

An operable 16×16 pixel passive matrix cholesteric display was made by coating and printing the various display elements on a fabric substrate. The sequence of the layers and materials layers are the same as in the Example 6 except that an insulation layer between the first conductive electrode and encapsulated liquid crystal layer was made of the polyurethane dispersion WITCOBOND W232.

EXAMPLE 9

An operable 16×16 pixel passive matrix cholesteric display was made by coating and printing the various display elements on a fabric substrate. The sequence of the layers and materials are the same as in the Example 6 except that a second insulation layer was introduced between the encapsulated liquid crystal layer and the second transparent conductive electrode. The clear layer of polyurethane dispersion WITCOBOND W232 was deposited on the top of the encapsulated liquid crystal layer using a doctor blade. The thickness of this layer was approximately 2–3 microns. Also, this display does not have a top clear coat layer.

EXAMPLE 10

An operable 16×16 pixel passive matrix cholesteric display was made by coating and printing the various display elements on a plastic substrate. The plastic substrate was a PET sheet with thickness of 137 microns available from Teijin (Japan). In order to establish a black background for the reflective display a black paint (KRYLON) was first coated on the back side of the substrate by spraying and dried at room temperature. A layer of conductive polymer (ELP-3040 available from Agfa-Gevaert, Belgium) was screen printed on the other side of the plastic substrate as 5 mm wide, 15 cm long strips spaced 1mm apart to serve as the column electrodes of the passive matrix display. After coating, the conducting polymer was cured at 100° C. for 10 minutes. A thin insulation layer (1–2 µm) of the polyurethane dispersion WITCOBOND W232 (available from Crompton Corporation, CT) was cast on the conductive layer using a doctor blade technique. A layer of encapsulated cholesteric liquid crystal in the form of a water-based emulsion in a polymer binder was coated on the insulation layer using a doctor blade having a 25 micron gap and allowed to dry for 1 hour at room temperature. The thickness of encapsulated liquid crystal layer was approximately 8–10 µm. The emulsion was prepared from 0.4 g of yellow CLC KLC19 (EM Industries of Hawthorne, N.Y.) and 0.27 g of NeoRez R967 and was emulsified with a homogenizer (PowerGen 700) at 1000 rpm for 3–4 min. at room temperature. The content of liquid crystal and binder in the encapsulated layer was 78% and 22%, respectively. The emulsified CLC formed droplets which are about 3-15 µm in diameter. A second conductive electrode was formed of the highly transparent conductive polymer Dipcoat, available from Agfa. A thin layer of the conductive polymer was deposited using air brushing over a mask and cured at room temperature. The mask was patterned to provide 5 mm wide, 15 cm long strips spaced 1 mm apart to form the row electrodes of the passive matrix display. Connected to the drive circuitry for multiplexing and addressed to an image using a cumulative drive scheme as disclosed in U.S. Pat. No. 6,133,895, the bistable cholesteric material could be switched to the planar (yellow reflective) texture by application of 95 volts or to the focal conic (non-reflective texture) with application of 65 volts.

EXAMPLE 11

An operable 16×16 pixel passive matrix cholesteric display was made by coating and printing the various display elements on a plastic substrate. The sequence of the layers and materials are the same as in the Example 10 except that a second insulation layer was introduced between encapsulated liquid crystal layer and the second transparent conductive electrode. The clear layer of polyurethane dispersion WITCOBOND W232 was deposited on the top of the encapsulated liquid crystal layer using a doctor blade. The thickness of this layer was approximately 2–3 microns.

EXAMPLE 12

An operable 2×6 pixel cholesteric display was made by coating and printing the various display elements on a plastic substrate. The plastic substrate was. a 137 micron thick PET sheet coated with an ITO conductive layer (available from Tijin, Japan). The ITO patterning was made by etching. Each pixel was 20 mm wide and 13 mm long and serves as the electrode of the passive matrix display. In order to establish a black background for the reflective display a black paint (KRYLON) was first coated on the back side of the substrate by spraying and dried at room temperature. A water-based emulsion of cholesteric liquid crystal in polymer binder was coated on the ITO layer using a doctor blade having a 25 micron gap and allowed to dry for 1 hour at room temperature. The thickness of encapsulated liquid crystal layer was approximately 8–10 µm. The emulsion was prepared from 0.4 g of green CLC KLC19 (EM Industries of Hawthorne, N.Y.) and 0.27 g of NeoRez R967 and was emulsified with a homogenizer (PowerGen 700) at 1000 rpm for 3–4 min at room temperature. The content of liquid crystal and binder in the encapsulated layer was 78% and 22%, respectively. The emulsified CLC formed droplets which are about 3–15 µm in diameter. A second conductive electrode of highly transparent conductive polymer, Dipcoat available from Agfa, was deposited using air brushing over a mask and cured at room temperature. The mask provides a solid electrode of the passive matrix display. The bistable cholesteric material could be addressed to the planar (yellow reflective) texture by application of 60 volts or to the focal conic (non-reflective texture) with application of 35 volts. The display film has a contrast ratio of 16:1 and brightness of 28%. The electro-optical curves are shown in FIG. 9. The data for reflectance vs. wavelength is presented in FIG. 8 with a contrast ratio of 16:1 and brightness of 28%.

EXAMPLE 13

An operable 2×6 pixel cholesteric display was made by coating and printing the various display elements on a plastic substrate. The materials and sequence of the layers are the same as in the Example 12 except that a clear coat of the polyurethane dispersion WITCOBOND W232 was used for protection of the display. A thin transparent layer of polyurethane dispersion was deposited on the top of the second conductive electrode using a doctor blade. The thickness of this layer was approximately 2–3 microns.

EXAMPLE 14

An operable 2×6 pixel cholesteric display was made by coating and printing the various display elements on a plastic substrate. The materials and sequence of the layers are the same as in the Example 12 except that the encapsulated liquid crystal was CLC with a reflective band in the blue region of the spectrum. The bistable cholesteric material could be addressed to the planar (blue reflective) texture by application of 80 volts or to the focal conic (non-reflective texture) with application of 50 volts.

EXAMPLE 15

An operable 2×6 pixel cholesteric display was made by coating and printing the various display elements on a plastic substrate. The materials and sequence of the layers are the same as in the Example 12 except that the encapsulated liquid crystal was CLC with a reflective band in the yellow region of the spectrum. The bistable cholesteric material could be addressed to the planar (yellow-green reflective) texture by application of 70 volts or to the focal conic (non-reflective texture) with application of 40 volts.

EXAMPLE 16

An operable 2×6 pixel passive matrix cholesteric display was made by coating and printing the various display elements on a plastic substrate. The materials and sequence of the layers are the same as in the Example 12 except that the encapsulated liquid crystal was CLC mixed with 1 wt % of BAB6. The purpose of the BAB6 additive was to improve contrast ratio and brightness. The assembled display was cured under UV light for 30 min under an applied electric field which switches the CLC into homeotropic state. The bistable cholesteric material could be addressed to the planar (green reflective) texture by application of 115 volts or to the focal conic (non-reflective texture) with application of 70 volts per pixel. The display film has a contrast ratio of 25:1 and brightness of 30%.

EXAMPLE 17

An operable 2×6 pixel cholesteric display was made by coating and printing the various display elements on a plastic substrate. The materials and sequence of the layers are the same as in the Example 16 except that the assembled display was cured under UV light for 30 min. in the absence of an electric field. The bistable cholesteric material could be addressed to the planar (green reflective) texture by application of 110 volts or to the focal conic (non-reflective texture) with application of 65 volts per pixel. The display film has contrast ratio of 19:1 and brightness of 30%.

EXAMPLE 18

An operable 4×1 pixel cholesteric display was made by coating and printing the various display elements on a black plastic substrate. The plastic substrate was a black PET sheet with thickness of 125 microns. A layer of conductive polymer ELP-3040 was screen printed on the plastic substrate as a 3.5×10 cm strip to serve as the solid electrode for the passive matrix display. After casting the conducting polymer was cured at 100° C. for 10 minutes. A water-based emulsion of CLC in NeoRez R967 binder was coated from water-based emulsion on the conductive polymer layer using a doctor blade having a 25 micron gap and allowed to dry for 1 hour at room temperature. A second conductive electrode was formed from the conductive polymer Dipcoat deposited as a thin layer using air brushing over a mask and cured at room temperature. The mask provides a 4×1 pixelated electrode.

EXAMPLE 19

An operable 16×16 pixel passive matrix cholesteric display was made by coating and printing the various display elements on a plastic substrate. Black paint for background and the first conductive layer were deposited as described in the Example 10. A layer of microencapsulated CLC in NeoRez R967 binder was coated from water-based slurry on the conductive polymer layer using a doctor blade having a 25 micron gap and allowed to dry for 1 hour at room temperature. Each individual droplet of CLC (KLC2 from EM Industries) was encapsulated in an individual shell consisting of cross-linked gelatin using a coacervation process (produced by Liquid Crystal Resources, Inc., IL). 5 wt % of latex binder was added to microencapsulated liquid crystal slurry to provide binder between individual droplets. The coating was very rugged and scratch resistant and does not require any protection layers. The bistable cholesteric material could be addressed to the planar (green reflective) texture by application of 60 volts or to the focal conic (non-reflective texture) with application of 35 volts using a cumulative drive scheme with frequency of 10 Hz and pulse width of 100 ms.

EXAMPLE 20

An operable 2×2 pixel cholesteric display was made by coating and printing the various display elements on a white paper substrate. In order to establish a black background for the reflective display a black paint (KRYLON) was first coated on the paper substrate by spraying and dried at room temperature. A first conductive electrode made of conductive polymer Dipcoat was air brushed over a mask and cured at room temperature for an hour. The mask provides 2 strips 15 mm wide, 50 mm long separated apart by 2 mm distance. A layer of encapsulated yellow CLC in NeoRez R967 binder was coated from water-based emulsion on the conductive polymer layer using a doctor blade having a 25 micron gap and allowed to dry for 1 hour at room temperature. A second conductive electrode of Dipcoat conductive polymer was deposited as a thin transparent layer using air brushing over a mask and cured at room temperature. The mask provides two strips 15 mm wide, 50 mm long separated apart by 2 mm distance. The display film has contrast ratio of 18:1 and brightness of 32%.

EXAMPLE 21

An operable 2×6 pixel cholesteric display with two electro-active layers was made by coating and printing the various display elements on a plastic substrate. The plastic substrate with patterned ITO layer, encapsulated CLC layer and the second conductive electrode were the same as in the Example 12. The CLC helixes were right handed (RH). The thin insulation layer of UV curable optical adhesives NOA 72 (available from Norland Products) was spin coated (at 3000 rpm) on the top of second conductive layer. The insulation layer was cured by exposure to UV lamp with intensity of several milliwatts per square centimeter for 4 min. A second layer of encapsulated cholesteric liquid crystal in polyurethane binder (NeoRez R967) was coated from water-based emulsion on the insulation layer using a doctor blade. The CLC helixes were left handed (LH). The thickness of encapsulated liquid crystal layer was approximately 8–10 μm. A third conductive transparent electrode made of conductive polymer Dipcoat was deposited over a mask using air brushing and cured at room temperature. The mask provides a solid electrode of the passive matrix display. Finally, the top clear coat of NOA 72 was spin coated (at 3000 rpm) on the third conductive electrode. Each encapsulated CLC layer can be addressed separately.

EXAMPLE 22

An operable 2×6 pixel cholesteric display with two electro-active layers was made by coating and printing the various display elements on a plastic substrate. The plastic substrate with patterned ITO layer was the same as in the Example 12. The encapsulated blue CLC layer in PVA binder was deposited from aqueous emulsion with a doctor blade technique as described previously. To prepare the emulsion, approximately 0.350 g of CLC, 0.250 g of 20% PVA aqueous solution, and 0.100 g of monohydric alcohol were emulsified with a homogenizer (PowerGen 700) at 1000 rpm for 3–4 min at room temperature. Encapsulating material, PVA (Celveol 205 with an 88% hydrolization, from Celanese Chemicals) was initially purified using Soxhlet extraction method. Emulsified CLC formed droplets which are about 2–10 μm in diameter. The thickness of encapsulated liquid crystal layer was approximately 10–12 μm. The thin insulation layer of UV curable NOA 72 was spin coated (at 3000 rpm) on the top of the encapsulated layer. The insulation layer was cured by exposure to UV lamp with intensity of several milliwatts per square centimeter for 4 min. A second conductive transparent electrode made of conductive polymer Dipcoat was deposited over a mask using air brushing and cured at room temperature. The mask provides a solid electrode of the passive matrix display. A second layer of yellow encapsulated cholesteric liquid crystal in PVA binder was coated from water-based emulsion on the second conductive electrode using a doctor blade. The thickness of encapsulated liquid crystal layer was approximately 10–12 μm. A second conductive transparent electrode made from conductive polymer Dipcoat was deposited over a mask using air brushing and cured at room temperature. The mask provides a solid electrode of the passive matrix display. The second insulation layer of UV curable NOA 72 was spin coated on the top of the second encapsulated CLC layer. A third conductive transparent electrode made of conductive polymer Dipcoat was deposited over a mask using air brushing and cured at room temperature. The mask provides a solid electrode of the passive matrix display. Each encapsulated CLC layer can be addressed separately.

EXAMPLE 22

An operable cholesteric layer was fabricated on fabric using droplet dispersions by the PIPS method. The first step was to pass a piece of black rayon fabric coated with neoprene through a laminator at 100° C. and then clean it with methanol to prepare the surface. Next, a layer of conductive polymer, Agfa EL-P 3040 was screen printed onto the neoprene and cured at 130° C. for 2 minutes to form the bottom electrode. An open-face Polymerization Induced Phase Separation (PIPS) mixture consisting of 75% KCL19 cholesteric liquid crystal and 25% pre-polymer mixture was cast onto the fabric using a #12 Meyer rod. The pre-polymer mixture had the following composition: 40% 2-Ethylhexyl Methacrylate, 31% Isobornyl Methacrylate, 18% Pentafluoropropyl Acrylate, 9% Trimethylol Propane Triacrylate, and 2% Irgacure 651, the photoinitiator. The film was then irradiated for 10 minutes with UV light (ELC4001, Electrolite Corp., 3.75 mW/cm$^2$) while contained in a clear Tupperwear container (Rubbermaid StainShield, 2.1 QT) being purged with a $N_2$ gas stream. The purpose of the $N_2$ stream was twofold; 1.) to enable polymerization of the acrylate monomers by purging the atmosphere with an inert gas thereby prohibiting the scavenging of radicals via $O_2$ [K. Studer, C. Decker, E. Beck, R. Schwalm, Progress in Organic Coatings 48 92–100 (2003)], 2.) to keep the black fabric cool while undergoing high intensity UV irradiation. During the curing process, the pre-polymer mixture polymerizes causing the liquid crystal to phase separate into droplets. After curing, the film was rinsed with Isopropyl Alcohol to remove any non-encapsulated liquid crystal present on the surface. After rinsing, the sample is dried using compressed air. Finally, the surface was segmented into 3 pixels using Scotch tape (3M) strips and 5 layers of Dipcoat conductive polymer (700) were airbrushed onto the surface of the film and allowed to dry in air for 15 minutes. After drying, the tape was removed and the pixels were individually switchable. The sample was switched at 170 Volts (f=20 Hz) to the planar state and at 100 Volts (f=20 Hz) to the focal conic state. In the planar state, the maximum reflectivity is 23% at 500 nm whereas the focal conic state has a reflectivity of 8.25% at 500 nm. The sample was very flexible—easily rolling around a pencil or conforming to a rounded surface without changing the bistable liquid crystal texture.

EXAMPLE 24

An operable cholesteric layer was fabricated on the polymer planarized fabric of Example 23 using droplet dispersions by the PIPS method. The first step was to clean the neoprene pre-planarization layer that is coated on the fabric with Isopropyl Alcohol to prepare the surface. Next, a polymer planarization layer was added to smooth out the neoprene layer. The polymer planarization layer consists of a mixture of 82% 2-Ethylhexyl Methacrylate 10% Pentafluoropropyl Methacrylate, 6% Trimethylol Propane Triacrylate, and 2% Irgacure 651. If the fabric substrate is not planarized, the weave of the substrate will cause nonuniformities in the planar texture across the pixel as thin spots will switch at a lower voltage than thicker spots. A layer of conductive polymer, Agfa EL-P 3040 with 1.0% adhesion promoter (PLM158) and 0.5% wetting agent (TPR156), was screen printed through a 4-pixel mask onto the substrate and cured at 85° C. for 40 minutes to form the bottom electrode. An open-faced PIPS mixture consisting of 75% KCL19 cholesteric liquid crystal and 25% pre-polymer mixture was cast onto the fabric using a #12 Meyer rod and cured as in Example 23. After curing, the film was rinsed with Isopropyl Alcohol to remove any non-encapsulated liquid crystal present on the surface. After rinsing, the sample is dried using a $N_2$ stream. Finally 15 layers of Dipcoat conductive polymer were airbrushed onto the surface of the PIPS film and allowed to dry in air for 15 minutes. The sample was switched at 130 Volts (f=20 Hz) to the planar state and at 60 Volts (f=20 Hz) to the focal conic state. The sample was very flexible—easily rolling around a pencil or conforming to a rounded surface without changing the bistable liquid crystal texture.

EXAMPLE 25

An operable cholesteric layer was fabricated on planarized fabric using droplet dispersions by the PIPS method in the same method as in Example 24 with the exception that an insulation layer was added between the first conductive layer and the open-faced PIPS layer. The method of preparation is identical to Example 24 up to and including the first conductive layer. In order to prevent top to bottom shorts from the bottom layer of conductive polymer to the top layer of conductive polymer, an insulation layer was applied over the first conductive layer. The insulation layer consists of a thin (~5 micron) layer of pre-polymer (50% Bisphenol A Glycerolate Diacrylate, 48% Isopropanol, and 2% Irgacure) that is cast using a number 2.5 wire-wound rod and is UV-polymerized in a nitrogen environment for 10 minutes. The polymeric composition of the insulation layer is not that critical so long as it wets the surface of the conductive polymer and the planarization layer. The subsequent PIPS layer and remaining layers were added to the insulation layer as described in Example 24. The sample was switched at 150 Volts (f=20 Hz) to the planar state and at 70 Volts (f=20 Hz) to the focal conic state. The sample was very flexible—easily rolling around a pencil or conforming to a rounded surface without changing the bistable liquid crystal texture.

EXAMPLE 26

An operable cholesteric layer was fabricated on planarized fabric using droplet dispersions by the PIPS method in the same method as in Example 25 with the exception that an isolation layer was added between the polymer planarization layer and the first conductive layer. The method of preparation is identical to Example 24 up to and including the polymer planarization layer. To enhance the wetting of the conductive polymer to the planarization layer, a thin isolation layer was used consisting of 50% Bisphenol A Glycerolate Diacrylate, 48% Isopropanol, and 2% Irgacure. This layer was cast using a number 2.5 wire-wound rod and UV cured for 15 minutes in an $N_2$ environment. A layer of conductive polymer, Agfa EL-P 3040, was deposited over the isolation layer by screen printing through a 4-pixel mask onto the substrate and cured at 85° C. for 40 minutes to form the bottom electrode. The remainder of the sample was prepared identically to Example 25 from the insulation layer forward. The sample was switched at 150 Volts (f=20 Hz) to the planar state and at 70 Volts (f=20 Hz) to the focal conic state. The sample was very flexible—easily rolling around a pencil or conforming to a rounded surface without changing the bistable liquid crystal texture.

EXAMPLE 27

A sheet of the bare rayon/neoprene fabric substrate material of Thor Labs (Newton, N.J.) used in Examples 1–9 and 22–26 was cut to a circle of diameter of 30 cm then draped over a pedestal of diameter of 18 cm and the projection photographed and area measured. A drape coefficient of 53% was measured for the bare fabric substrate. The substrate was then coated with the same layers as Example 1 and the drape coefficient again measured and found to be 59%, only slightly larger than the bare substrate.

What is claimed is:

1. A drapable electrically addressable liquid crystal display comprising a substrate material, a layer of liquid crystal material, a first conducting electrode disposed on a first side of said liquid crystal layer proximal said substrate, and a second conducting electrode disposed on a second side of said liquid crystal layer distal of said substrate, said electrodes adapted to be connected to electronic drive circuitry wherein said substrate is selected from a textile fabricated from natural or synthetic fibers, a sheet of polymeric material or paper and display has a drape coefficient less than 100%.

2. The display of claim 1 further including a planarization layer interposed between said substrate and said first electrode.

3. The display of claim 1 further including an insulation layer disposed between at least one of said electrodes and said liquid crystal layer.

4. The display of claim 1 further including a protective coating disposed as un uppermost layer of at least a portion of said display.

5. The display of claim 1 wherein one side of said substrate is smoother than an opposite side of said substrate.

6. The display of claim 5 wherein said one side of said substrate is made smoother by deposition of a layer of material thereon.

7. The display of claim 1 wherein at least one of said electrodes is a conducting polymer or carbon nanotube material.

8. The display of claim 1 wherein said second electrode is substantially optically transmissive.

9. The display of claim 1 wherein said liquid crystal lays comprises cholesteric liquid crystal material.

10. The display of claim 9 wherein said liquid crystal layer comprises a dispersion of droplets of said liquid crystal material.

11. The display of claim 10 wherein said dispersion is selected from an emulsion, a phase separated liquid crystal material, or a microencapsulated liquid crystal material.

12. The display of claim 11 wherein said dispersion is a polyurethane latex emulsion.

13. The display of claim 12 wherein said emulsion comprises a mix of liquid crystal and latex in a ratio of from about 2:1 to about 6:1.

14. The display of claim 9 wherein said liquid crystal has a positive dielectric anisotropy and a pitch length effective to reflect light in the visible or infrared spectrum.

15. The display according to claim 1 further comprising a layer polyurethane latex interposed between said substrate and said, first electrode.

16. The display of claim 1 wherein said first electrode is comprised of said substrate.

17. The display of claim 1 including a plurality of conducting electrodes arranged in substantially parallel lines on a first side of said liquid crystal layer proximal said substrate, and a plurality of conducting electrodes arranged in substantially parallel lines on an opposite side of said liquid crystal layer, said lines of electrodes on opposite sides of said liquid crystal layer being oriented substantially perpendicular to each other.

18. The display of claim 1 further including at least one additional liquid crystal layer disposed adjacent said layer of liquid crystal material.

19. The display of claim 1 further including at least one additional liquid crystal layer disposed adjacent said layer of liquid crystal material, and including conducting electrodes disposed on opposite sides thereof, whereby said additional layer is independently electrically addressable.

20. The display of claim 1 wherein said display has a drape coefficient less than about 98%.

21. The display of claim 1 wherein said display has a drape coefficient less than about 95%.

22. The display of claim 1 operatively linked to electronic drive circuitry.

23. The display according to claim 1 further including a layer at photoconductive material interposed between said liquid crystal layer and said first electrode.

24. The display according to claim 1 wherein said first electrode comprises an active matrix backplane. said first electrode comprises an active matrix backplane.

25. A flexible or drapable reflective liquid crystal display comprising a non-transparent flexible or drapable substrate material, a layer of liquid crystal material, a first conducting electrode coated, printed or laminated on a first side of said liquid crystal layer proximal said substrate, and a second conducting electrode coated, printed or laminated on a second side of said liquid crystal layer distal of said substrate, said electrodes adapted to be connected to electronic drive circuitry wherein said substrate is selected from a textile fabricated from natural or synthetic fibers, a sheet of polymeric material or paper.

26. The display of claim 25 wherein said substrate is itself non-transparent.

27. The display of claim 25 wherein said substrate includes a layer of non-transparent material disposed thereon to render it non-transparent.

28. The display of claim 25 further including a planarization layer interposed between said substrate and said first electrode.

29. The display of claim 25 further including an insulation layer disposed between at least one of said electrodes and said liquid crystal layer.

30. The display of claim 25 further including a protective coating disposed as an uppermost layer of at least a portion of said display.

31. The display of claim 25 wherein one side of said substrate is smoother than an opposite side of said substrate.

32. The display of claim 31 wherein said one side of said substrate is made smoother by deposition of a layer of material thereon.

33. The display of claim 25 wherein at least one of said electrodes is a conducting polymer or carbon nanotube material.

34. The display of claim 25 wherein said second electrode is substantially optically transmissive.

35. The display of claim 25 wherein said liquid crystal layer comprises cholesteric liquid crystal material.

36. The display of claim 35 wherein said liquid crystal layer comprises a dispersion of droplets of said liquid crystal material.

37. The display of claim 36 wherein said dispersion is selected from an emulsion, a phase separated liquid crystal material, or a microencapsulated liquid crystal material.

38. The display of claim 37 wherein said dispersion is a polyurethane latex emulsion.

39. The display of claim 38 wherein said emulsion comprises a mix of liquid crystal and latex in a ratio of from about 2:1 to about 6:1.

40. The display of claim 35 wherein said liquid crystal has a positive dielectric anisotropy and a pitch length effective to reflect light in the visible or infrared spectrum.

41. The display according to claim 25 further comprising a layer of polyurethane latex interposed between said substrate and said first electrode.

42. The display of claim 25 wherein said first electrode is comprised of said substrate.

43. The display of claim 25 including a plurality of conducting electrodes arranged in substantially parallel lines on a first side of said liquid crystal layer proximal said substrate, and a plurality of conducting electrodes arranged in substantially parallel lines on an opposite side of said liquid crystal layer, said lines of electrodes on opposite sides of said liquid crystal layer being oriented substantially perpendicular to each other.

44. The display of claim 25 further including at least one additional liquid crystal layer disposed adjacent said layer of liquid crystal material.

45. The display of claim 25 further including at least one additional liquid crystal layer disposed adjacent said layer of liquid crystal material, and including conducting electrodes disposed on opposite sides thereof, whereby said additional layer is independently electrically addressable.

46. The display of claim 25 operatively linked to electronic drive circuitry.

47. The display according to claim 25 further including a layer of photoconductive material interposed between said liquid crystal layer and said first electrode.

48. The display according to claim 25 wherein said first electrode comprises an active matrix backplane.

49. The display of claim 25 having no frame structure adapted to maintain any individual layers of said display in sliding apposition.

50. The display of claim 25 wherein said substrate is drapable.

51. The display of claim 50 wherein said display has a drape coefficient less than about 98%.

52. The display of claim 50 wherein said display has a drape coefficient less than about 95%.

53. An electrically addressable liquid crystal display comprising, as a substrate, paper, a sheet of polymeric material or textile fabricated from natural or synthetic fibers a layer of liquid crystal material, a first conducting electrode coated, printed or laminated on a first side of said liquid layer proximal said substrate and a second conducting electrode coated, printed or laminated on a second side of said liquid crystal layer distal of said substrate, said electrodes adapted to be connected to electronic drive circuitry and display has a drape coefficient less than 100%.

54. The display of claim 53 further including a planarization layer interposed between said substrate and said first electrode.

55. The display of claim 53 further including an insulation layer disposed between at least one of said electrodes and said liquid crystal layer.

56. The display of claim 53 further including a protective coating disposed as un uppermost layer of at least a portion of said display.

57. The display of claim 53 wherein one side of said substrate is smoother than an opposite side of said substrate.

58. The display of claim 57 wherein said one side of said substrate is made smoother by deposition of a layer of material thereon.

59. The display of claim 53 wherein at least one of said electrodes is a conducting polymer or carbon nanotube material.

60. The display of claim 53 wherein said second electrode is substantially optically transmissive.

61. The display of claim 50 wherein said liquid crystal layer comprises cholesteric liquid crystal material.

62. The display of claim 61 wherein said liquid crystal layer comprises a dispersion of droplets of said liquid crystal material.

63. The display of claim 62 wherein said dispersion is selected from an emulsion, a phase separated liquid crystal material, or a microencapsulated liquid crystal material.

64. The display of claim 63 wherein said dispersion is a polyurethane latex emulsion.

65. The display of claim 64 wherein said emulsion comprises a mix of liquid crystal and latex in a ratio of from about 2:1 to about 6:1.

66. The display of claim 61 wherein said liquid crystal has a positive dielectric anisotropy and a pitch length effective to reflect light in the visible or infrared spectrum.

67. The display according to claim 53 further comprising a layer of polyurethane latex interposed between said substrate and said first electrode.

68. The display of claim 53 wherein said first electrode is comprised of said substrate.

69. The display of claim 53 including a plurality of conducting electrodes arranged in substantially parallel lines on a first side of said liquid crystal layer proximal said substrate, and a plurality of conducting electrodes arranged in substantially parallel lines on an opposite side of said liquid crystal layer, said lines of electrodes on opposite sides of said liquid crystal layer being oriented substantially perpendicular to each other.

70. The display of claim 53 further including at least one additional liquid crystal layer disposed adjacent said layer of liquid crystal material. including at least one additional liquid crystal layer disposed adjacent said layer of liquid crystal material.

71. The display of claim 53 further including at least one additional liquid crystal layer disposed adjacent said layer of liquid crystal material, and including conducting electrodes disposed on opposite sides thereof, whereby said additional layer is independently electrically addressable.

72. The display of claim 53 wherein said display has a drape coefficient less than about 98%.

73. The display of claim 53 wherein said display has a drape coefficient less than about 95%.

74. The display of claim 53 operatively linked to electronic drive circuitry.

75. The display according to claim 53 further including a layer of photoconductive material interposed between said liquid crystal layer and said first electrode.

76. The display according to claim 53 wherein said first electrode comprises an active matrix backplane.

77. The display of claim 53 having no frame structure adapted to maintain any individual layers of said display in sliding apposition.

78. A method of preparing a drapable or flexible liquid crystal display on a drapable or flexible substrate material comprising coating, printing or laminating a first conducting electrode on said substrate, coating printing or laminating a layer of liquid crystal material on said first electrode and coating printing or laminating a second conducting electrode on said liquid crystal layer and adapting said electrode to be connected to electronic drive circuitry wherein said substrate is selected from a textile fabricated from natural or synthetic fibers, a sheet of polymeric material or paper.

79. The method of claim 78 further comprising optionally coating, printing or laminating one or more additional layers selected from a planarization layer, an insulation layer and a protective coating layer on or between one or more of said electrode layers, liquid crystal layer or substrate.

80. A drapable liquid crystal display prepared according to the method of claim 76 wherein said substrate is drapable.

81. A flexible liquid crystal, display prepared according to the method of claim 78 wherein said substrate is flexible.

* * * * *

UNITED STATES PATENT AND TRADEMARK OFFICE
CERTIFICATE OF CORRECTION

| | | |
|---|---|---|
| PATENT NO. | : 7,236,151 B2 | Page 1 of 1 |
| APPLICATION NO. | : 11/006100 | |
| DATED | : June 26, 2007 | |
| INVENTOR(S) | : Doane et al. | |

It is certified that error appears in the above-identified patent and that said Letters Patent is hereby corrected as shown below:

Under item (56), References Cited, Other Publications, page 2, column 2, line 20, please delete "stimulation", and insert therefor --simulation.--

Under item (56), References Cited, Other Publications, page 3, column 2, line 1, please delete "Crystal" and insert therefor --Crystals.--

In the claims, column 28, line 47, claim 9, please delete "lays" and insert therefor --layer--.

In the claims, column 29, line 24, claim 23, please delete "at" and insert thereof --of--.

In the claims, column 32, lines 1-3, please delete "including at least one additional liquid crystal layer disposed adjacent said layer of liquid crystal material." in its entirety.

Signed and Sealed this

Eighth Day of July, 2008

JON W. DUDAS
*Director of the United States Patent and Trademark Office*

(12) EX PARTE REEXAMINATION CERTIFICATE (8128th)
United States Patent
Doane et al.

(10) Number: US 7,236,151 C1
(45) Certificate Issued: Mar. 29, 2011

(54) LIQUID CRYSTAL DISPLAY

(75) Inventors: J. William Doane, Kent, OH (US); Asad A. Khan, Kent, OH (US); Irina Shiyanovskaya, Stow, OH (US); Albert Green, Springfield, VA (US)

(73) Assignee: Kent Displays Incorporated, Kent, OH (US)

Reexamination Request:
No. 90/010,932, Apr. 14, 2010

Reexamination Certificate for:
Patent No.: 7,236,151
Issued: Jun. 26, 2007
Appl. No.: 11/006,100
Filed: Dec. 7, 2004

Certificate of Correction issued Jul. 8, 2008.

Related U.S. Application Data

(60) Provisional application No. 60/565,586, filed on Apr. 27, 2004, and provisional application No. 60/539,873, filed on Apr. 28, 2004.

(51) Int. Cl.
*G09G 3/36* (2006.01)

(52) U.S. Cl. .......................... 345/87; 345/107
(58) Field of Classification Search .................. None
See application file for complete search history.

(56) References Cited

U.S. PATENT DOCUMENTS

| | | | |
|---|---|---|---|
| 4,566,935 A | 1/1986 | Hornbeck | |
| 4,680,579 A | 7/1987 | Ott | |
| 6,017,468 A | 1/2000 | Chung et al. | |
| 6,147,741 A | 11/2000 | Chen et al. | |
| 6,518,944 B1 | 2/2003 | Doane et al. | |
| 6,723,479 B2 | 4/2004 | Van De Witte et al. | |
| 6,977,099 B2 | 12/2005 | Umeya et al. | |
| 7,072,095 B2 | 7/2006 | Liang et al. | |
| 7,170,481 B2 | 1/2007 | Doane et al. | |
| 7,236,151 B2 | 6/2007 | Doane et al. | |
| 2002/0167500 A1 | 11/2002 | Gelbman | |
| 2003/0214471 A1 | 11/2003 | Topelberg | |
| 2005/0003144 A1 | 1/2005 | Buttgen et al. | |
| 2005/0179678 A1 | 8/2005 | Nose et al. | |
| 2005/0195354 A1 | 9/2005 | Doane et al. | |
| 2006/0066803 A1 * | 3/2006 | Aylward et al. | 349/158 |
| 2006/0124899 A1 | 6/2006 | Welter | |
| 2007/0026163 A1 | 2/2007 | Schneider et al. | |

FOREIGN PATENT DOCUMENTS

| | | |
|---|---|---|
| EP | 1058147 | 12/2000 |
| JP | 3168613 | 7/1991 |
| WO | 02/093240 | 11/2002 |
| WO | 2004029708 | 4/2004 |

OTHER PUBLICATIONS

R.D. Sterling et al., "Video-Rate Liquid Crystal Light Valve Using Amorphous Silicon Photoconductor" proceedings of the SID, XXI, 327–329 (1990).
H. Hiji et al., SID Digest of Papers, vol. XXXIV, 1560–1563, (2005).
E. Sackman, J. Chem Phys. Soc., 93, 7088–7090 (1971).
T. Ikeda, J. Mater. Chem., 13, 2037–2057 (2003).
S. Pieraccini et al., Chem., Comm., 598–599 (2003).
S. Pieraccini et al., Chem. Eur. J., 10, 5632–5639 (2004).
B.L. Feringa et al., J. Chem. Soc. Chem. Comm., 288–290, (1993).
B.L. Feringa et al., Chemical Reviews, vol. 100, pp. 1789–1816 (2000).
Li et al., J. Am. Chem. Soc., 9 vol. 129, pp. 12908–12909 (2007).
A. Bobrovsky et al., Polymers for Advanced Technologies, vol. 13, pp. 595–600 (2002).

(Continued)

*Primary Examiner*—Tuan H Nguyen

(57) ABSTRACT

A flexible liquid crystal display is provided wherein an addressable liquid crystal layer is disposed on a single flexible substrate so that the display itself will exhibit flexibility. The substrate is preferably a flexible non-transparent material and more preferably a drapable material such as fabric.

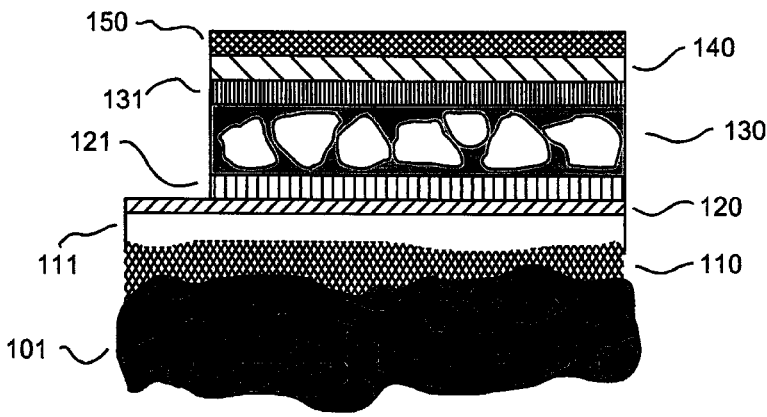

OTHER PUBLICATIONS

M. Brehmer et al., Advanced Materials, 10, 1438–1441 (1998).

P. van de Witte et al., Jornal of Applied Physics, 85, 7517–7521 (1999).

J.W. Doane et al., Proceedings of Japan Diaplay '92 (Hiroshima), pp. 73–76 (1992).

Fundamentals of Liquid Crystal Devices, D–K Yang and S.T. Wu, Chapter 1 (John Wiley & Sons, New York 2006).

Office Action dated Mar. 8, 2006 from Application No. 11/046,487 filed Jan. 28, 2005, which has issued to U.S. Patent No. 7,170,481.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 45, 49, 51, 52 and 55 are cancelled.

Claims 1, 4, 25, 29, 40, 43, 46, 53, 56 and 78-80 are determined to be patentable as amended.

Claims 2, 5-11, 14, 17-22, 26-28, 30-37, 44, 50, 54, 57-63, 66, 69-74 and 81 dependent on an amended claim, are determined to be patentable.

Claims 12, 13, 15, 16, 23, 24, 38, 39, 41, 42, 47, 48, 64, 65, 67, 68 and 75-77 were not reexamined.

1. A drapable electrically addressable liquid crystal display comprising a substrate material, a layer of liquid crystal material, a first conducting electrode disposed on a first side of said liquid crystal layer proximal said substrate, and a second conducting electrode disposed on a second side of said liquid crystal layer distal of said substrate, said electrodes adapted to be connected to electronic drive circuitry, *an electrical insulation layer disposed between and in contact with at least one of said electrodes and said liquid crystal layer,* wherein said substrate is selected from a textile fabricated from natural or synthetic fibers, a sheet of polymeric material or paper and display has a drape coefficient less than 100%.

4. The display of claim 1 further including a protective coating disposed as [un] *an* uppermost layer of at least a portion of said display.

25. A [flexible or] drapable reflective liquid crystal display comprising a non-transparent [flexible or] drapable substrate material, a layer of liquid crystal material *dispersed in polymer,* a first conducting electrode coated, printed or laminated on a first side of said liquid crystal layer proximal said substrate, and a second conducting electrode coated, printed or laminated on a second side of said liquid crystal layer distal of said substrate, said electrodes adapted to be connected to electronic drive circuitry wherein said substrate is selected from a textile fabricated from natural or synthetic fibers, a sheet of polymeric material or paper.

29. The display of claim 25 further including an *electrical* insulation layer disposed between *and in contact with* at least one of said electrodes and said liquid crystal layer.

40. The display of claim 35 wherein said liquid crystal has a positive dielectric anisotropy and a pitch length effective to reflect light in the visible [or infrared] spectrum.

43. The display of claim 25 [including a plurality of conducting electrodes arranged in substantially parallel lines on a first side of said liquid crystal layer proximal said substrate, and a plurality of conducting electrodes arranged in substantially parallel lines on an opposite side of said liquid crystal layer, said lines of electrodes on opposite sides of said liquid crystal layer being oriented substantially perpendicular to each other] *wherein said first conducting electrode is patterned as parallel strips to form rows of conducting electrodes and said second conducting electrode is patterned as parallel strips to form columns of conducting electrodes, said rows of conducting electrodes and said columns of conducting electrodes being perpendicular to each other.*

46. The display of claim 25 [operatively linked] *connected* to [electronic ] drive [circuitry] *electronics*.

53. An electrically addressable liquid crystal display comprising, as a substrate, paper, a sheet of polymeric material or a textile fabricated from natural or synthetic fibers, a layer of liquid crystal material, a first conducting electrode coated, printed or laminated on a first side of said liquid *crystal* layer proximal said substrate, and a second conducting electrode coated, printed or laminated on a second side of said liquid crystal layer distal of said substrate, said electrodes adapted to be connected to electronic drive circuitry, *an electrical insulation layer disposed between and in contact with at least one of said electrodes and said liquid crystal layer,* and *said* display has a drape coefficient less than 100%.

56. The display of claim 53 further including a protective coating disposed as [un] *an* uppermost layer of at least a portion of said display.

78. A method a preparing a drapable or flexible liquid crystal on a drapable or flexible substrate material comprising coating, printing or laminating a first conducting electrode on said substrate, coating, printing or laminating a layer of liquid crystal material on said first electrode, coating, printing or laminating a second conducting electrode on said liquid crystal layer, *disposing an electrical insulating layer between and in contact with one of said electrodes and said liquid crystal layer,* and adapting said [electrode] *electrodes* to be connected to electronic drive circuitry, wherein said substrate is selected from a textile fabricated from natural or synthetic fibers, a sheet of polymeric material or paper.

79. The method of claim 78 further comprising optionally coating, printing or laminating one or more additional layers selected from a planarization layer[, an insulation layer] and a protective coating layer on or between one or more of said electrode layers, liquid crystal layer or substrate.

80. A drapable liquid crystal display prepared according to the method of claim [76] *78* wherein said substrate is drapable.

* * * * *